US008152955B2

(12) United States Patent
Murakami

(10) Patent No.: US 8,152,955 B2
(45) Date of Patent: Apr. 10, 2012

(54) METHOD FOR REUSING RECORDING MEDIUM, REUSABLE RECORDING MEDIUM, METHOD FOR PRODUCING REUSABLE RECORDING MEDIUM AND IMAGE FORMING APPARATUS

(75) Inventor: Kakuji Murakami, Atsugi (JP)

(73) Assignee: Ricoh Company, Ltd., Tokyo (JP)

(*) Notice: Subject to any disclaimer, the term of this patent is extended or adjusted under 35 U.S.C. 154(b) by 923 days.

(21) Appl. No.: 12/162,619

(22) PCT Filed: Jan. 30, 2007

(86) PCT No.: PCT/JP2007/051857
§ 371 (c)(1),
(2), (4) Date: Jul. 30, 2008

(87) PCT Pub. No.: WO2007/086614
PCT Pub. Date: Aug. 2, 2007

(65) Prior Publication Data
US 2008/0317487 A1 Dec. 25, 2008

(30) Foreign Application Priority Data
Jan. 30, 2006 (JP) ................................ 2006-020656

(51) Int. Cl.
*B32B 38/10* (2006.01)
(52) U.S. Cl. ....................................... 156/711; 156/752
(58) Field of Classification Search .................. 156/711, 156/752
See application file for complete search history.

(56) References Cited

U.S. PATENT DOCUMENTS

| | | | |
|---|---|---|---|
| 5,607,534 | A | 3/1997 | Kawanishi et al. |
| 5,619,765 | A | 4/1997 | Tokita et al. |
| 5,638,842 | A | 6/1997 | Tokita et al. |
| 5,643,380 | A | 7/1997 | Saitoh et al. |
| 5,736,286 | A | 4/1998 | Kaneko et al. |
| 5,782,254 | A | 7/1998 | Tanikawa et al. |
| 5,968,301 | A | 10/1999 | Murakami et al. |
| 2006/0062997 | A1 | 3/2006 | Murakami |

FOREIGN PATENT DOCUMENTS

| | | |
|---|---|---|
| GB | 2 293 612 A | 4/1996 |
| JP | 4 67043 | 3/1992 |

(Continued)

OTHER PUBLICATIONS

Machine translation of JP 2005-234162, 2005.*

(Continued)

*Primary Examiner* — Mark A Osele
(74) *Attorney, Agent, or Firm* — Oblon, Spivak, McClelland, Maier & Neustadt, L.L.P.

(57) ABSTRACT

A method for reusing a recording medium forms an image on the recording medium by use of an image forming material, and removes the image forming material from the recording medium through thermal transfer by use of a peeling member. The recording medium is paper produced by applying a treatment liquid at a size pressing after paper making and then drying the treatment liquid. The treatment liquid includes a water-soluble or water-dispersible polymer having an alkyl group with carbon atoms at its side chain as an image-repellant substance. The image forming material includes a thermoplastic resin, and the adhesive strength between the peeling member and the image forming material is higher than the adhesive strength between the recording medium and the image forming material.

11 Claims, 10 Drawing Sheets

FOREIGN PATENT DOCUMENTS

| | | |
|---|---|---|
| JP | 8 286579 | 11/1996 |
| JP | 8-314178 | 11/1996 |
| JP | 2584112 | 11/1996 |
| JP | 9-170191 | 6/1997 |
| JP | 10 74025 | 3/1998 |
| JP | 11 143109 | 5/1999 |
| JP | 2958772 | 7/1999 |
| JP | 3222613 | 8/2001 |
| JP | 2002-225450 | 8/2002 |
| JP | 3345472 | 8/2002 |
| JP | 2003 270834 | 9/2003 |
| JP | 3690063 | 6/2005 |
| JP | 2005 221572 | 8/2005 |
| JP | 2005 234162 | 9/2005 |
| JP | 2005-338430 | 12/2005 |
| JP | 2006 22427 | 1/2006 |

OTHER PUBLICATIONS

Machine Translation of JP 2006-22427, 2006.*
U.S. Appl. No. 08/643,456, filed May 8, 1996, Kaneko, et al.
U.S. Appl. No. 08/457,513, filed Jun. 1, 1995, Kawanishi et al.
U.S. Appl. No. 12/162,619, filed Jul. 30, 2008, Murakami.

* cited by examiner

METHOD FOR REUSING RECORDING MEDIUM, REUSABLE RECORDING MEDIUM, METHOD FOR PRODUCING REUSABLE RECORDING MEDIUM AND IMAGE FORMING APPARATUS

TECHNICAL FIELD

The present invention relates to methods for reusing recording media in repeated sequential processes of image forming and erasing, reusable recording media suited to the methods, methods for producing the reusable recording media and image forming apparatuses with a control unit to feed the recording media.

BACKGROUND ART

In recent years, printers, analogue copiers, digital copiers and printing machines on the basis of electrophotographic, ink-jet or thermal transfer processes have been widely popularized, thus extremely great amounts of paper have been consumed for recording media. The paper, which being typically used for the recording media, is made of renewable pulp produced from wood.

However, large amounts of energy are consumed in various paper producing steps such as pulping steps to extract cellulose fibers from wood and paper-drying steps to dry the resultant paper. A part of these steps have been innovated to reduce $CO_2$ amount by way of making use of biofuels such as black liquor, which being a pulp-extract residual matter, in place of fossil fuels; however, all of these steps cannot make use of such biofuels.

$CO_2$ gas emitted from fossil fuels is believed to cause warming of earth, and also depletion of fossil fuel sources and environmental protection are serious problems, which demand to reduce the consumed quantity of paper. Saving of fuel may lead to an effective fuel utilized for other than paper production, even when the fuel being a biofuel. Recently, destructive lumbering for paper making seems to be on a decline; however, all of paper cannot be of wood from well-controlled forests; thus it is an important social problem to protect forests and to prevent deterioration of global environment through suppressing the consumed amount of paper.

In addition, paper typically contains inorganic ingredients free from burnout and decay, thus disposed paper generates waste product to be landfilled in a certain rate. However, places for waste products are definitely limited and restricted, thus the reduction of consumed amount of paper is desired also from the viewpoint of such a social issue.

In order to address these problems, paper has been conventionally reused in a way, for example, that used information recording paper is collected, the collected paper is decomposed once into pulp in paper making plants and then reproduced into paper.

However, these processes require approximately equivalent energy with those starting from fresh pulp since other energy is necessary for collecting/transporting, repulping and paper making even though new wood source being unnecessary.

In addition, the rate of recycled pulp is typically limited to about 30% for high-quality paper of information recording paper in order to prevent such quality problems as low stiffness, less whiteness and bleeding at printing.

As such, it is necessary in order to produce high-quality information-recording paper with higher whiteness that the rate of recycled pulp is limited and the pulp is produced from recycled waste paper, which possibly resulting in a cost higher than that of the processes from fresh wood in some cases. Furthermore, collection and regeneration of recording media with recorded information may cause problems in terms of preservation of secret and privacy since the recording media with recorded information are put into circulation from offices or houses.

In order to address these problems, various processes are proposed to reuse recording media in a way that images, on once-used recording media, are erased to generate the recording media. For example, such a process is proposed that a plastic, metal, paper with no liquid-permeability, or ceramics is employed as the recording medium, then a hot-melting peeler is interposed between hot-melting images and the recording medium, and the images are peeled away through heating the hot-melting peeler (e.g. see Patent Literature 1). An image erasing apparatus is proposed in which images, formed on a recording medium treated with a release agent, are transferred and peeled away by use of an endless belt having a hot-melting resin on the surface (e.g. see Patent Literature 2). An erasable paper is proposed in which images on a sheet or regular paper, prepared by coating and drying a silicone sealing agent on a coat paper, is removed through attaching and peeling a tape (e.g. see Patent Literature 3). Patent Literature 3 describes an erasable paper with a mark or an expression for mechanically distinguishing from regular paper, in order to prevent erroneous disposal due to confusion between the erasable paper and regular paper or to avoid erroneous treatment of regular paper with image erasing devices, in which the mark may be applied by printing or handwriting and the expression may display to be erasable by means of perforations.

The recording media, described in the Patent Literatures, have a base material formed of plastics, contain a silicone sealing material as an image-repellent agent, or utilize a commercially available adhesive tape.

In cases of recording media having a base material formed of plastics, users are occasionally beaten by an electrical shock since the materials tend to accumulate electrical charge during transferring steps in electrophotographic processes and the electrical charge hardly dissipates from the materials even after the transferring. In addition, plastics are typically more expensive than paper.

Patent Reference 4 etc. a utilization of silicone compounds for an image-repellent agent in order to make easy the image removal. It will be certain that the silicone compounds in the recording media make easy to remove images formed on the recording media by transfer with heat and pressure, even without coating a repellant agent on the recording media.

However, silicone compounds are considerably expensive, thus the recording media containing silicone compounds as the image-repellent agent will suffer from higher production cost. Furthermore, silicone compounds typically decrease image-fixing ability excessively, thus there may arise such problems that image-quality degrade due to offset at image formation, image-forming materials drop out from the recording media in use, which making images illegible and/or polluting the surround. In addition, it is difficult to record onto recording media, on which silicone compounds being coated, by use of water-based pens or oil pens; it is difficult to coat aqueous liquids since silicone compounds are not water-soluble.

The present inventors et al. have proposed a reusable recording medium comprising an image-repellent agent of acrylic ester or methacrylic ester polymers having fluorinated alkyl groups (e.g. see Patent Literature 3). However, employment of fluorinated polymers possibly suffers from similar problems as those of silicone; that is, fluorine compounds are likely to be expensive, which makes the cost of recording media higher. The fluorocarbon compounds typically provide excessive image-repellent effect, thus it is difficult to control fixing ability of image forming materials onto recording media, more specifically, it is difficult to assure fixing ability of recording media since fluorocarbon resins tend to excessively decrease the fixing ability of image forming materials and/or it is difficult to record onto recording media by use of water-based pens or oil pens. Furthermore, the fluorocarbon compounds described in Patent Literature 5 are insoluble in water and hardly soluble in usual organic solvents, and halogen-containing solvents are necessary for the coating, which causes an environmental problem.

The present inventors et al. have also proposed a recording medium containing an image-repellent agent that is comprised of a fluorocarbon compound, a silicone compound, an alkyl group-containing surfactant (e.g. see Patent Literature 6). However, employment of the fluorocarbon compound and/or the silicone compound causes problems similar with those described above. In some cases, toner-repellent agents containing an alkyl group may remove image forming materials; however, there exist such problems as the fixing ability of image-forming materials is unstable and/or the peeling of image-forming materials is insufficient, since the surfactants are of monomolecular with small molecular weights, thus the surfactants tend to migrate into peeling members, image-forming materials, and/or recording medium, therefore, the amount or rate of image forming materials-repellent agents is changeable.

The present inventors et al. have also proposed a method for removing image-forming materials, in which a water-containing liquid is impregnated into paper with images formed by electrophotographic processes, the paper and a peeling member are contacted and pressed while being hated in a condition that the adhesive force between the paper and image forming materials is week, then the hot-flexible image forming materials are peeled away by use of paper (e.g. see Patent Literature 7). This method is advantageous in that transferring and peeling may be carried out under lowered adhesive force since a shear force generates between water-swelling paper fibers and non-swelling image forming materials.

However, when this method is applied to conventional regular paper, the image forming materials are often incompletely removed due to occasionally higher adhesive force between image forming materials and paper, and/or a part of paper often is peeled away along with the image forming materials. It is also troublesome in that the addition of water tent to cause wrinkle or curl and then paper jam under repeated usage in image-forming apparatuses and/or image erasing apparatuses even when the additional water being a small amount. Addition of much water requires much energy to evaporate the water and leads to size change of regenerated recording media.

The present inventors et al. have also proposed a recording medium in order to solve the problem in the methods for removing image-forming materials on recording media through impregnating a water-containing liquid as described in Patent Literature 7 etc., in which the adhesive force with toners is controlled by applying compounds with an alkyl group such as alkyl ketene dimer onto a surface of recording media thereby to control the contact angle with liquids having a surface tension equivalent with that of toners (e.g. see Patent Literature 8). In the Patent Literature 8, the adhesive force with image forming materials is reduced by use of a synthetic sizing agent such as alkyl ketene dimer. This proposal is premised on that additional water can weaken the adhesive force between image forming materials and the recording media in the removal of the image forming materials. Therefore, it is difficult to apply the recording medium, disclosed in the Patent Literature 8, to image-erasing processes without adding a water-containing liquid as image-erasing promoting liquid since the adhesive force is excessively strong.

Furthermore, the alkyl ketene dimer of sizing agent described in the Patent Literature 8 is monomolecular compounds having a melting point of 40° C. to 70° C.; therefore, the higher temperatures at the processes for erasing image-forming materials and/or in image-forming apparatuses melt the alkyl ketene dimer and promote the migration thereof into peeling members, image-forming materials, and/or recording media, consequently, the amount or rate on the surface of recording media is unstable. Accordingly, repeated usage thereof often leads to unstable fixing ability or difficult peeling of image forming materials, decrease of friction coefficient in the recording media, or difficult transportation of the recording media. Furthermore, the alkyl ketene dimer applied on the recording media often moves to paper-feeding rollers of image forming apparatuses or image erasing apparatuses, which making difficult to transport the recording media. In addition, Patent Literature 8 describes that styrene, olefin or acrylic polymers may be used as a surface sizing agent other than the alkyl ketene dimer; however, there is no descriptions in terms of specific molecular structure of these polymers or excellent effect over the alkyl ketene dimer.

Patent Literature 1: Japanese Patent Application Laid-Open (JP-A) No. 01-297294 (Japanese Patent (JP-B) No. 2958772)

Patent Literature 2: JP-A No. 04-64472 (JP-B No. 2584112)

Patent Literature 3: JP-A No. 04-67043

Patent Literature 4: JP-A No. 10-319620 (JP-B No. 3690063)

Patent Literature 5: JP-A No. 06-219068 (JP-B No. 3222613)

Patent Literature 6: JP-A No. 10-74025

Patent Literature 7: JP-A No. 07-13383 (JP-B No. 3345472)

Patent Literature 8: JP-A No. 08-286579

DISCLOSURE OF THE INVENTION

The present invention aims to solve the problems described above in the art. That is, it is an object of the present invention to provide a method for reusing recording media that affords advantages (i) to (v) shown below; it is another object of the present invention to provide a reusable recording medium, it is still another object of the present invention to provide a method to provide a reusable recording medium, and it is still another object of the present invention to provide an image forming apparatus that afford advantages (i) to (v) shown below from other aspects.

(i) It is applicable to image forming methods in particular to electrophotographic methods that form images on recording media by use of conventional image forming materials that contain thermoplastic resins; the images may be fixed in a commercially feasible way; the resultant images may be removed from recording media through thermal transfer by use of a peeling member without applying an image removal-promoting liquid such as water and organic solvents; and it is repeatedly applicable to sequential image forming/erasing processes;

(ii) image forming methods in particular electrophotographic methods may provide high-quality images by use of image forming materials that contain thermoplastic resins without image dropout and/or background smear due to offset at thermal fixing;

(iii) repeated usage of the recording media causes substantially no change in image-quality, fixing ability or erasing ability;

(iv) cost and/or environmental load may be lessened in the production of the recording media;

(v) resources in the processes or apparatuses for forming or erasing images may be lessened, and also no waste product to be landfilled yields from image forming or erasing processes, environmental load and cost may be reduced.

The objects and advantages may be attained by the present invention.

In a first aspect, the present invention provides a method for reusing a recording medium that comprises forming an image on a recording medium by use of an image forming material, and removing the image forming material from the recording medium through thermal transfer by use of a peeling member, wherein the recording medium is a paper produced through a step of applying a treatment liquid at size pressing after paper making and then drying the treatment liquid, the treatment liquid comprises a water-soluble or water-dispersible polymer having an alkyl group with a carbon number of 8 or more at its side chain as an image-repellent substance, the image forming material comprises a thermoplastic resin, and the adhesive strength between the peeling member and the image forming material is higher than the adhesive strength between the recording medium and the image forming material.

In accordance with the invention described above, the image forming materials may be completely removed without using an image removal-promoting liquid, high-quality images may be formed and the fixing ability may be maintained in a sufficient level, and the resultant images may be completely erased repeatedly through a thermal transfer process, since the recording media have a feasible fixing ability and the polymer is employed for an image-repellent substance in the recording media.

Preferably, the water-soluble or water-dispersible polymer is produced by saponifying a polymer formed from an olefin, which having a double bond at alpha-site and a carbon number of 10 or more, and maleic anhydride.

In the method for reusing a recording medium, the recording media containing the saponified polymer as the image-repellent substance may exhibit an appropriate adhesive strength with image forming materials containing a thermoplastic resin and make possible to completely remove the image forming materials fixed on the recording media through a thermal transfer process. In addition, handwriting property and/or transporting property of recording media may be improved since friction coefficient of the recording media may be fallen in a proper range.

Furthermore, the polymer of the image-repellent substance is water-soluble or water-dispersible, therefore, conventional size press systems for paper production may be used without modification, and the method according to the present invention may be carried out without addressing a countermeasure for combustibility.

Preferably, the treatment liquid comprises, in addition to the water-soluble or water-dispersible polymer, at least a compound selected from the group consisting of starches, starch derivatives, polyvinyl alcohols, styrene-butadiene copolymer emulsions, vinyl acetate emulsions, and water-soluble or water-dispersible acrylic resins, in an amount that the weight ratio of the polymer to the compound is from 1:50 to 1:1 as solid content.

The compounds selected from the group described above are typically inexpensive compared to the polymers with an alkyl group having a carbon number of 8 or more, which making possible to reduce the cost of the recording media. In addition, the compounds described above in an amount within a certain range may effect to improve handwriting property and/or to raise stiffness of recording media without deteriorating the effect of image-repellent substance, adjust the balance of fixing ability and peeling property, and reduce environmental load without increasing $CO_2$ emission since starches and starch derivatives are produced from plants.

Preferably, the treatment liquid is applied to one side of the paper in an amount of 0.5 to 4 $g/m^2$ as solid content. The amount of the treatment liquid may improve the balance of fixing property and erasing property of the image forming materials; that is, the fixing ability may be enhanced due to relatively large irregularity caused from cellulose fibers as well as appropriate adhesive with image forming materials, and also the effect of image-repellent substance is well-balanced, which making possible to remove the image forming materials on the recording media onto the peeling member through thermal transfer.

Preferably, an expression is displayed on the recording medium to be reusable through removing the image forming material.

The expression on the recording medium may provide users with sure information when reusable materials are desired. That is, reusable recording media and/or non-reusable recording media may be certainly distinguished in user selection, or image forming or image erasing apparatuses. In addition, the expression may prevent inclusion of non-reusable recording media into image erasing apparatuses, for example, paper-jam due to the inclusion may be avoided.

The recording medium according to the present invention may be difficult to be distinguished from non-reusable recording media by visual inspection, thus the expression to be reusable may be valuable in many cases.

Preferably, the image forming material is removed through thermal transfer by use of the peeling member without applying an image removal-promoting liquid.

When the inventive recording medium is utilized in the inventive method for reusing a recording medium in particular, image forming materials on the recording medium may be completely removed. The exclusion of image removal-promoting liquid may effectively prevent uneven swelling of cellulose fibers in recording media, which may reduce the occurrences of curl, wrinkle or jam at image forming or image erasing apparatuses and raise the reusable times of recording media; and also the energy to evaporate its medium such as water comes to unnecessary.

Preferably, the image forming material comprises a wax in an amount of 1% by mass or more. In the inventive method for reusing a recording medium, the wax in an amount of 1% by mass in the image forming material may effectively prevent the transfer of the image forming material onto various parts or members in the image forming processes such as fixing rollers, fixing belts, intermediate transfer rollers, etc. even with no use of release agents such as silicone oils.

Preferably, the surface layer of the peeling member, which contacting with the recording medium at the thermal transfer, comprises a thermoplastic resin that exhibits plasticity at the thermal transfer temperature of the image forming material.

The thermo plastic resin in the surface layer of the peeling member may bring about effective removal of image forming materials on recording media even with higher irregularity.

Preferably, the image forming material is removed through the thermal transfer at an upstream side and at a downstream side by use of two different peeling members, the surface layer of the peeling member at upstream side, which contacting with the recording medium at the thermal transfer, comprises a thermoplastic resin that exhibits substantially no plasticity at the thermal transfer temperature of the image forming material, and the surface layer of the peeling member at the downstream side, which contacting with the recording medium at the thermal transfer, comprises a thermoplastic resin that exhibits plasticity at the thermal transfer temperature of the image forming material.

The removal of the image forming materials at an upstream side and at a downstream side by use of two different peeling members as described above may bring about more complete removal of the image forming materials and higher durability of the peeling members.

Preferably, the image is formed by use of a powdery image-forming material that contains a thermoplastic resin and a colorant by way of an electrophotographic process.

The use of the powdery image-forming material may be effective to assure appropriate fixing ability in cases where the recording medium has a relatively high surface irregularity, for example, in the recording medium according to the present invention described below.

In another aspect, the present invention provides a reusable recording medium, utilized in the method for reusing a recording medium described above, wherein the recording medium is a paper produced through a step of applying a treatment liquid at size pressing after paper making and then drying the treatment liquid, and the treatment liquid comprises a water-soluble or water-dispersible polymer having an alkyl group with a carbon number of 8 or more at its side chain as an image-repellent substance.

In accordance with the invention described above, a reusable recording media suited to the inventive method for reusing a recording medium described above is provided, and such advantages described above may be effectively taken as complete removal of the image forming materials repeatable usage thereof.

In still another aspect, the present invention provides a method for producing a reusable recording medium, utilized in the method for reusing a recording medium described above, wherein the recording medium is produced through a step of applying a treatment liquid at size pressing after paper making and then drying the treatment liquid, and the treatment liquid comprises a water-soluble or water-dispersible polymer having an alkyl group with a carbon number of 8 or more at its side chain as an image-repellent substance.

The method described above may allow to conduct the drying step by no more than one time, which making possible to decrease the production cost and the environmental load of the recording media; furthermore, the polymer of the image-repellent substance is water-soluble or water-dispersible, therefore, conventional size press systems for paper production may be used without modification.

In still another aspect, the present invention provides an image forming apparatus, adapted to use the reusable recording media described above, wherein the image forming apparatus comprises a thermally fixing unit configured to form an image by use of a thermoplastic powdery-image-forming material and to thermally fix the image on the recording medium.

The thermally fixing unit described above may allow image formation without image dropout or background smear.

Preferably, the thermally fixing unit comprises an oilless fixing device with no function to apply a liquid-release agent onto a surface of fixing members, and the image forming material comprises a wax in an amount of 1% by mass or more.

The wax in an amount of 1% by mass in the image forming material may effectively prevent the transfer of the image forming material onto various parts or members in the image forming processes such as fixing rollers, fixing belts, intermediate transfer rollers, etc. even with no use of the liquid-release agent such as silicone oils.

In still another aspect, the present invention provides an image forming apparatus, adapted to use the reusable recording media described above, wherein the image forming apparatus comprises:

plural paper-feed cassettes for storing recording medium, in which at least one of the plural paper-feed cassettes stores the reusable recording medium, and a control unit configured to optionally select the reusable recording medium to be fed from the paper-feed cassettes.

The image forming apparatus described above may allow users to conveniently select the usage of the reusable recording media, which making possible the effective and convenient usage of the reusable recording media.

BEST MODE FOR CARRYING OUT THE INVENTION

Figure 1A:
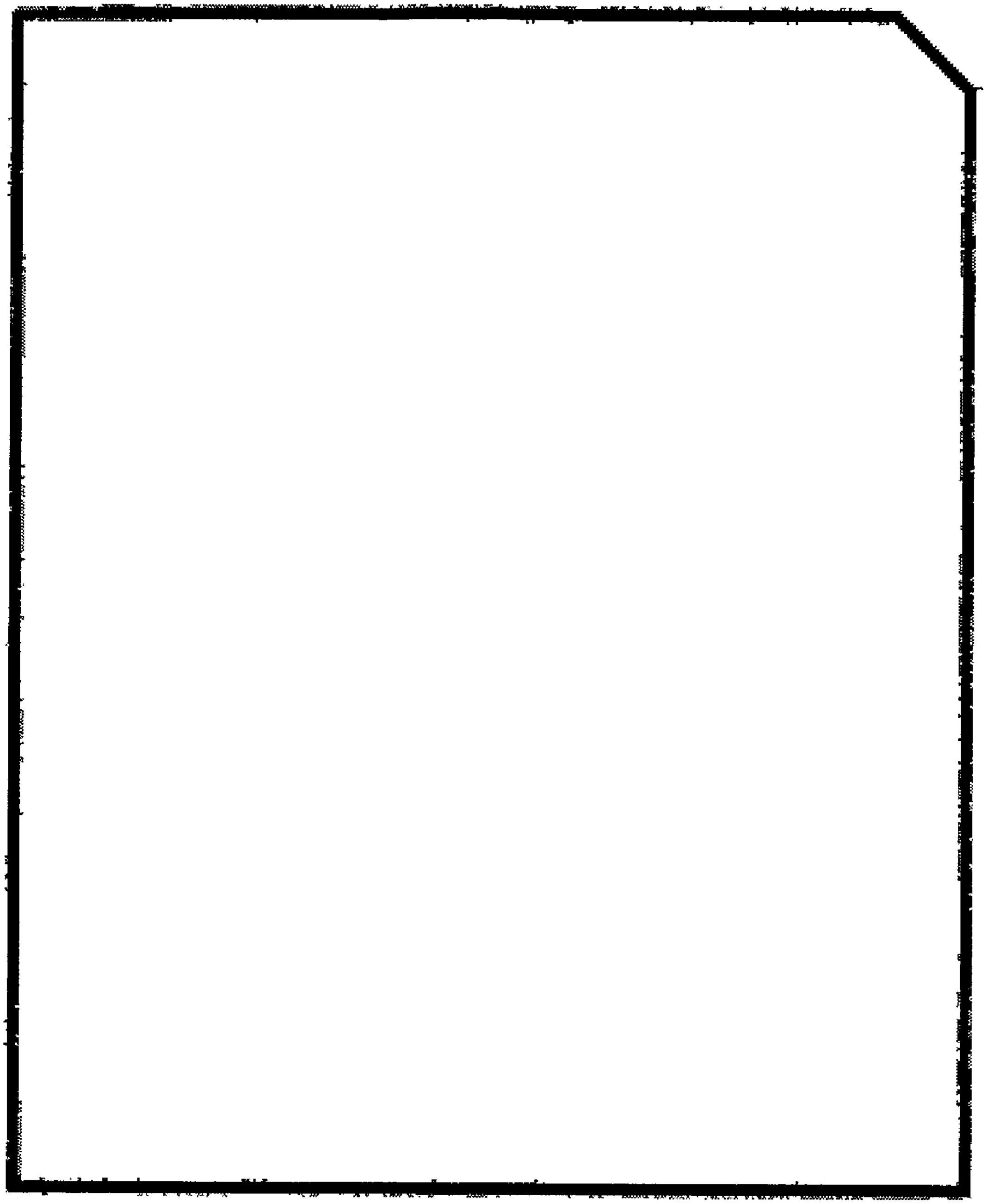
FIG. 1A is a schematic view that shows exemplary expressions for announcing the inventive recording media to be reusable.

Method for reusing a recording medium that comprises forming an image on a recording medium by use of an image forming material, and removing the image forming material from the recording medium through thermal transfer by use of a peeling member, wherein the recording medium is a paper produced through a step of applying a treatment liquid at size pressing after paper making and then drying the treatment liquid, the treatment liquid comprises a water-soluble or water-dispersible polymer having an alkyl group with a carbon number of 8 or more at its side chain as an image-repellent substance, the image forming material comprises a thermoplastic resin, and the adhesive strength between the peeling member and the image forming material is higher than the adhesive strength between the recording medium and the image forming material.

The inventive recording medium may be produced by making paper based on cellulose fibers, then applying an image-repellent substance in a size pressing step thereby to reduce the adhesive force with image removal-promoting liquids.

The cellulose fibers used in the paper making may be of wood such as chemical pulp and mechanical pulp, non-wood such as bagasse and kenaf, regenerated pulp from old paper, or regenerated pulp from waste sheets. The cellulose fibers may contain pigments such as calcium carbonate, titanium oxide, zinc oxide and barium sulfate and/or sizing agents such as rosins, alkenyl succinates and alkyl ketene dimers, and other chemicals.

The image-repellent substance reduces the adhesive force between the recording medium and the image forming material thereon, thereby making possible to remove the image forming material through thermal transfer by use of a peeling member.

In the present invention, image-repellent substance of a polymer, having an alkyl group with a carbon number of 8 or more at its side chain, may be inhibited for its migration within an/or outside the recording medium by virtue of the relatively long side chain, which allows stable fixing ability and peeling property of image forming materials under repeated usage of the recording medium.

As described above for the prior art, the image-repellent substance of conventional surfactants or waxes may lead to recording media on which the image forming materials being able to be transferred or erased; however, there are problems that the fixing ability and/or the peeling property are unstable under the storage of recording media with time in particular under higher temperatures and higher humidities since the surfactants or waxes are of monomolecular with small molecular weights. Furthermore, the image-repellent substance tends to migrate into peeling members, image forming materials or recording media by action of thermal stress and/or pressing at peeling and/or removing steps during their repeated usage, which are likely to arise problems in terms of unstable fixing ability and peeling property of image forming materials.

On the contrary, the image-repellent substance is a polymer in the present invention, thus the relatively long molecular length tends to inhibit the molecular migration compared to monomers such as surfactants and monomers, which leads to the effects intended for the image-repellent substance and resolves the problems of unstable properties under the storage or repeated usage.

The polymerization degree of the polymer as the image-repellent substance is preferably 3 to 5000. The polymer with excessively lower polymerization degrees tends to migrate into peeling members, image forming materials or recording media similar as the cases where monomolecular surfactants or waxes are employed, which resulting in unstable fixing ability and peeling property of image forming materials. On the other hand, the polymer with excessively higher polymerization degrees tends to decrease aqueous solubility or excessively higher solution viscosity, which resulting in difficult coating of the polymer solution. As such, the polymerization of the polymer as the image-repellent substance is preferably 20 to 1000 in particular.

The image-repellent substance, having an alkyl group with a carbon number of 8 or more at its side chain, may allow the thermal transfer of image forming materials onto peeling members even with no use of water or organic solvents and sufficiently decrease the adhesive strength of image forming materials enough to remove from the recording medium. The image-repellent substance, having an alkyl group with a carbon number of less than 8 at its side chain, tends to decrease the adhesive strength insufficiently.

There is no set limit for the carbon number; however, compounds with a carbon number of 26 or more are commercially difficult to obtain. The carbon number of alkyl groups is preferably 8 to 24, more preferably 10 to 22 from the viewpoint of proper image-repellency of recording media and appropriate balance of the fixing ability and the peeling property.

The alkyl group of the image-repellent substance may be linear or branched in order to reduce the adhesive strength of the image forming materials. Usually, the larger is the carbon number of the alkyl group, the more significant is the effect of the image-repellent substance. Specifically, the optimum carbon number depends on the polymer since the content of alkyl groups in the polymer or molecular structure at other than alkyl groups affect the effect of the image-repellent substance.

Specific examples of the polymers having an alkyl group with a carbon number of 8 or more include saponified olefin-maleic anhydride copolymers, polyacrylic esters, polymethacrylic esters, acrylic ester-acrylic acid copolymers, methacrylic ester-methacrylic acid copolymers, olefin-acrylic ester-acrylic acid copolymers, olefin-methacrylic ester-methacrylic acid copolymers, graft polymers of olefins with polyacrylic acids, graft polymers of olefins with polymethacrylic acids, etc. For example, the acrylic polymers having an alkyl group with a carbon number of 8 or more may be synthesized by polymerization of an ester monomer that is a reaction product of (meth)acrylic acid and an alcohol having an alkyl group with a carbon number of 8 or more.

Among these polymers, preferable are water-soluble or water-dispersible saponified products of polymers between olefins and maleic anhydride from the viewpoint of appropriate image-repellency of recording media and proper balance between the fixing ability and the peeling property. The olefins as used herein mean hydrocarbon compounds that preferably have a double bond at the alpha-site or the chain end and a carbon number of 10 or more, and are polymerizable through addition polymerization; more specifically, those expressed by the general formula (1) below are exemplified, in which R1 represents a linear alkyl group.

(1)

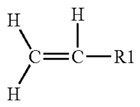

Specific example of the compounds expressed by the formula (1) is the compound expressed by the formula (2).

(2)

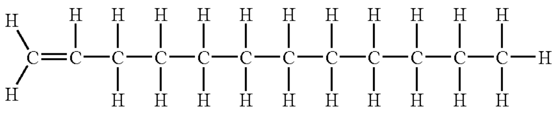

The olefins may also be those that have an alkyl group with a double bond at the alpha-site or chain end and a carbon number of 10 or more and have a blanched alkyl group as shown by the formula (3), in which R3 and R4 represent each a linear alkyl group.

(3)

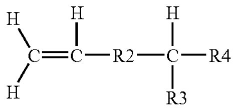

Olefins having a double bond at other than the alpha-site are exemplified by the formula (4) below, in which R5 and R6 in the formula (4) represent each a linear alkyl group with a carbon number of 1 or more.

(4)

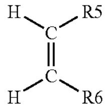

The olefin monomer for the polymer utilized in the present invention may be any compounds exemplified above; preferably, olefins having a double bond at the alpha-site are employed. That is, when an olefin polymerizes that has a double bond at the alpha-site, a polymer may be synthesized that has two carbon atoms at the ends of the alpha-olefin monomer within the principal chain and the other carbon atoms within the side chain. For example, when an alpha-olefin with a carbon number of 13 is polymerized, a polymer with a carbon number of 11 is synthesized.

Preferably, the carbon number of the olefin monomer is 10 or more, particularly preferably 12 to 20. When the carbon number is below 10, the image-repellency tends to be insufficient, specifically, the images on recording media are hardly transferred to peeling members without applying organic solvents or surfactant-containing liquids. The olefin-maleic anhydride copolymer may be synthesized by reaction of the olefin and maleic anhydride under heating and pressuring.

Olefin compounds of commercial mass product are typically a mixture of olefins with different carbon numbers. The inclusion of olefins having a carbon number of 9 or less scarcely affects the fixing ability or erasing property in general. In cases where olefin-maleic anhydride copolymers are employed, the fixing ability or erasing property of recording media typically depends on the compounds having a higher carbon number in the olefin mixture. The olefin is not necessarily required a double bond at the alpha-site; however, the double bonds at other than the alpha-site may be difficult to form a polymer since polymerization reaction hardly progresses.

Another monomer of the olefin-maleic anhydride copolymer is maleic anhydride expressed by the formula (5).

(5)

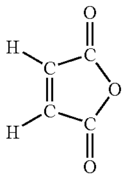

When maleic anhydride and an olefin undergo a polymerization reaction, for example, the both are dissolved in an organic solvent or the both are mixed with no organic solvent then heated in an autoclave to cause the polymerization reaction. The mole ratio of the olefin monomer to maleic anhydride is preferably from 1.3/1 to 1/1.3 in the polymerization reaction, which may bring about a polymer that provides proper fixing ability and stable image-erasing property. The reason is believed, without intending to be bound by any theory, that the range of mole ratio may bring about a polymer of alternative olefin and maleic anhydride with higher regularity.

In other words, it is believed that the paper of recording media, which being produced by applying a polymer having regularly an olefin portion for representing the image-repellency and an maleic acid portion for allowing water-solubility at size pressing after paper making, has s surface to which the maleic acid portion affords a degree of affinity with image forming materials even after drying the recording media, thus the fixing ability due to the maleic acid portion and the image-erasing ability due to the olefin portion can be well-balanced, and resulting in stably reusable recording media.

In the present invention, an olefin-maleic anhydride copolymer, from a polymerization reaction between an olefin monomer and maleic anhydride monomer, is hydrolyzed and saponified to prepare a water-soluble polymer, which is utilized as a treating liquid for an image-repellent substance at size pressing step.

The olefin-maleic anhydride copolymer, hydrolyzed and saponified in an alkaline solution, is considered to have the structure expressed by the formula (6) below, in which M1 and M2 represent each a base.

(6)

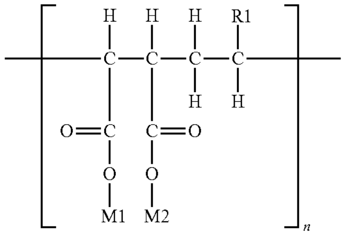

Examples of the base include sodium hydroxide, potassium hydroxide, lithium hydroxide, quaternary ammonium compounds and phosphonium compounds. Preferably, the olefin-maleic anhydride copolymer is saponified in an ammonium hydroxide aqueous solution and utilized as a water-soluble polymer. When the ammonium salt of the olefin-maleic anhydride copolymer is utilized as the image-repellent substance, and the treatment liquid containing the salt is heated and dried at size pressing after paper making, ammonia is detached from the salt to make the saponified olefin-maleic anhydride copolymer into non-soluble or hardly soluble within water, consequently, the material containing the image-repellent substance can be made water resistant.

The sequential processing, in which the olefin-maleic anhydride copolymer is made into water-soluble by being hydrolyzed and saponified using a base and is applied on a recording medium using an aqueous solvent, can be carried out safely and inexpensively, since aqueous solvents rather than organic solvents are utilized in the processing. In addition, the saponified olefin-maleic anhydride copolymer can be blended with other conventional inexpensive surface sizing agents such as starches, starch derivatives and polyvinyl alcohols without impairing the effects of the image-repellent substance, therefore, the combination with other surface sizing agents may bring about inexpensive reusable recording media with higher safety and lower environmental load.

Previously, silicone compounds or fluorocarbon compounds have been proposed for the image-repellent substance of reusable recording media; however, silicone compounds or fluorocarbon compounds hardly dissolve or disperse into water, thus it is difficult to add these compounds at size pressing after paper making. Furthermore, silicone compounds typically decrease image-fixing ability excessively even though the image erasing property is satisfactory, thus there may arise such problems that image quality degrades due to offset at image formation, image-forming materials drop out from the recording media in use, which making images illegible and/or polluting the surround. The present invention can also solve these problems.

Method for Producing Reusable Recording Medium

The inventive recording media are produced through a step of applying a treatment liquid at size pressing after paper making and then drying the treatment liquid, and the treatment liquid comprises a water-soluble or water-dispersible polymer having an alkyl group with a carbon number of 8 or more at its side chain as an image-repellent substance. The treatment liquid containing the image-repellent substance is applied before completely drying the resultant paper, then the treatment liquid is applied and dried, which avoids the duplicated drying of after the paper making and after the treatment-liquid application.

In the size pressing step, it is difficult to use a solvent other than water and hydrophilic organic solvents, and water is the desirable solvent in view of production safety. Therefore, the image-repellent substance is required to be water-soluble or water-dispersible. As described above, the olefin-maleic anhydride copolymer is preferably saponified in an ammonium hydroxide aqueous solution thereby to utilize as a water-soluble polymer; in addition, polymers containing (meth)acrylic acid derivatives are utilized as a water-soluble or ionic compound.

The size pressing step after the paper making step is a conventional step in paper making methods, thus a sizing agent is added in the step in order to retard the water infiltration into the resultant paper.

Two-roll sizing presses, gate roll sizing presses with metalling rolls, and rod metalling sizing presses with metalling rolls are usually utilized in the size pressing step. The inventive recording media may be produced by use of any sizing presses, specifically, conventional sizing presses may be utilized without modification.

In the size pressing step to produce the inventive recording media, various compounds may be included to the treatment liquid containing the polymer of the image-repellent substance; preferably, at least one compound selected from the group consisting of starches, starch derivatives, polyvinyl alcohols, styrene-butadiene copolymer emulsions, vinyl acetate emulsions, and water-soluble or water-dispersible acrylic resins is included in an amount of from 1/50 to 1/1 for the polymer to the compound as solid content.

These compounds are relatively inexpensive, thus the cost of the recording media may be reduced, and also the balance of the fixing ability and the peeling property between the recording media and the image-repellent substance may be adjusted by blending the compound and the polymer without deteriorating the effect of the image-repellent substance. Among the compounds described above, starches and their derivatives such as starch oxides and starch phosphates are derived from plants, which leading to less exhaust amount of $CO_2$ gas and less environmental load.

It is preferred that the liquid at the size pressing step contains the image-repellent substance and the other compounds in an amount of from 1/50 to 1/1 as solid content as described above. In cases where the content of the image-repellent substance is excessively low, the effect of the image-repellent substance is insufficient, resulting in insufficient removal of image forming materials from the recording media. The balance of the fixing ability and the peeling property may be well-controlled by use only the polymer of the image-repellent substance without the compounds described above. However, the inclusion of the compounds other than the polymer may increase the stiffness of paper, improve the writing property using ball pens, pencils, fountain pens, oily ink marker and aqueous ink marker, and decrease the cost of recording media due to their inexpensive price.

The treatment liquid at the size pressing step may contain a pigment in order to improve the recording media in terms of whiteness, transparency and friction coefficient, color for distinguishable information, or enhance writing property.

Examples of the white pigment include inorganic pigments such as kaolin, titanium oxide, zinc oxide, calcium carbonate, alumina, diatom earth, barium sulfate and silica, and organic pigments such as crosslinked styrene polymer, styrene-butadiene copolymers, styrene-acrylic copolymers and urea resins.

A small amount of color pigments such as phthalocyanine may provide distinguishable information to be a reusable recording medium or not. An additional dye at the size pressing step may color the reusable recording medium for the information.

The optimal amount of the treatment liquid, containing the image-repellent substance, applied at the size pressing step depends on the thickness or length of cellulose fibers or image forming materials; in a case of kraft pulp that is typically utilized for high-quality paper, the amount is preferably 0.5 to 4 $g/m^2$ as solid content at one side.

It is preferred that substantially the same amount of the same composition is applied to both sides of the inventive recording medium in order to make use of the both sides and prevent the curl; in such case, the amount of the composition is preferably 1 to 8 $g/m^2$ as dried amount.

In order to enhance the smoothness of the recording media, the recording media are preferably subjected to super-calendar treatment. This treatment may enhance the image-erasing ability and to reduce the amount of the composition containing the image-repellent substance.

It is preferred that the inventive reusable recording media have an expression able to reuse after erasing the image forming materials, which making possible for users to distinguish reusable recording media from usual non-reusable media.

The recording medium according to the present invention may be difficult to be distinguished from non-reusable recording media by visual inspection since the deposited amount of the composition is relatively small, thus the expression to be reusable may be valuable in many cases.

Figure 1B:
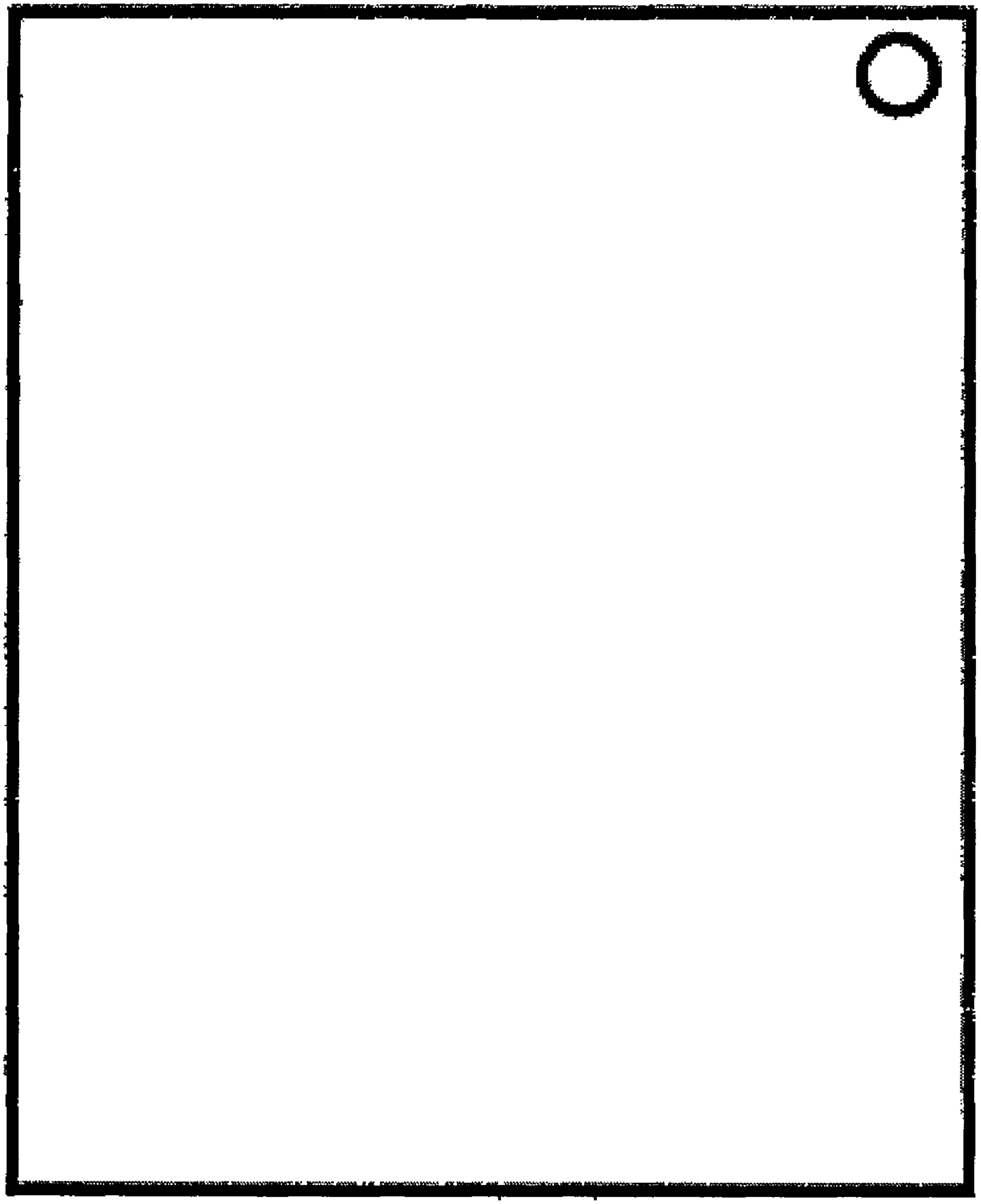
FIG. 1B is a schematic view that shows exemplary expressions for announcing the inventive recording media to be reusable.
Figure 1C:
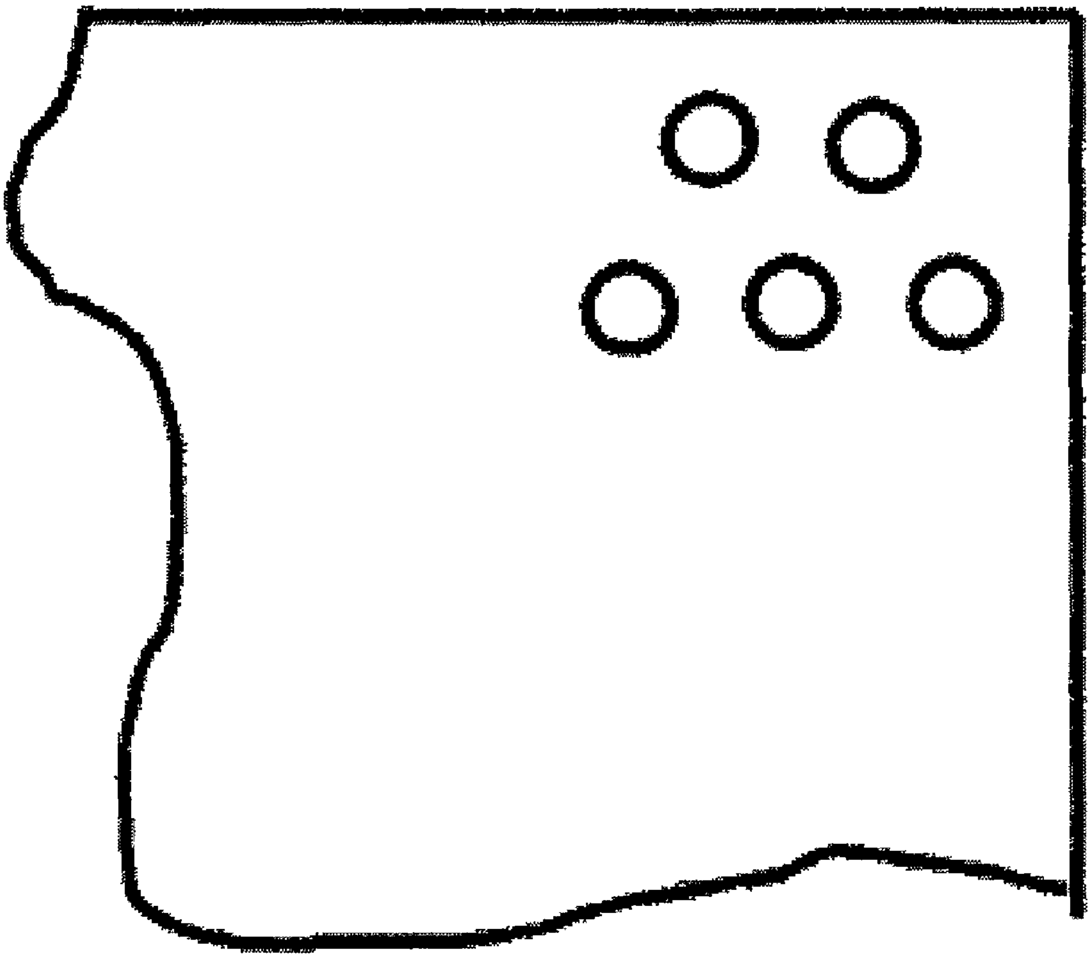
FIG. 1C is a schematic view that shows exemplary expressions for announcing the inventive recording media to be reusable.
Figure 1D:
FIG. 1D is a schematic view that shows exemplary expressions for announcing the inventive recording media to be reusable.

Examples of the expression to be reusable are a notch as shown in FIG. 1A, a perforation as shown in FIG. 1B, plural perforations as shown in FIG. 1C, and a bar code as shown in FIG. 1D; alternatively, marks other than bar codes, printing by use of light-absorptive inks non-detectable visually such as UV-rays and IR rays, fluorescent inks, dyes and pigments, in addition, IC tips sensitive or generating an electromagnetic wave may be available.

It is preferred that the expression to be reusable is hardly disappeared during image forming or erasing processes and easily distinguishable for users. From the viewpoint, the notch or perforation described above is most preferable.

Method for Reusing Recording Medium

The inventive method for reusing a recording medium carries out a series of forming and erasing an image repeatedly by use of a water-soluble or water-dispersible polymer having an alkyl group with a carbon number of 8 or more at its side chain as an image-repellent substance, in which the image forming material comprises a thermoplastic resin, and the adhesive strength between the peeling member and the image forming material is higher than the adhesive strength between the recording medium and the image forming material.

In order to remove image forming materials formed on a recording medium with a surface irregularity such as paper, it is difficult to remove the image through thermal transfer when the image forming material contains no thermoplastic resin, since image forming materials with no thermoplasticity offer insufficient contact between the image forming material and peeling member.

In the inventive method for reusing a recording medium, the image forming material is removed from the recording medium in a way that heating the image forming material on the recording medium to soften the image forming material, contacting a peeling member with the image forming material on the recording medium, separating the recording medium and the peeling member, transferring the image forming material onto the peeling member, thereby removing the image forming material from the recording medium.

Accordingly, the image forming material is required for the following properties: the image forming material has thermoplasticity and adheres to the peeling member; the image forming material has a cohesive force higher than the adhesive force with the recording media at separating the recording medium and the peeling member; the image forming material exhibits a moderate elasticity at heat-softened condition so as not infiltrate deeply into the recording medium; the image forming material has a degree of thickness on the recording medium so as to contact with the peeling member.

The process to form images may be properly selected as long as the image forming material has the necessary properties described above. The image forming process may be exemplified by conventional electrophotographic processes, in which a photoconductor is electrostatically charged, a latent image formed by exposure is developed by use of a powder toner, the developed tone image is transferred directly onto a recording medium or through an intermediate transfer body, and fixing the image forming material by heating.

In the popular electrophotographic apparatuses having a photoconductor, thermoplastic powder containing a thermoplastic resin is utilized as the image forming material; the image forming material is transferred onto a recording medium, then the image forming material is transferred onto a recording medium by use of a thermal fixing apparatus consisting of a heating roller, heat fixing belt, light irradiation unit, etc.

In addition to the conventional electrophotographic processes using a photoconductor, the other processes may be applied to the present invention, such as electrostatic recording processes in which electrostatic images are formed by controlling an ion stream using a needle electrode etc. and developed using a powder toner, or so-called toner-jet processes in which the stream of powdery toner particles is controlled by an electrode and images are formed on recording media. These processes usually utilize thermoplastic toners, which being thermally fixed similarly on recording media, thus can be suitably applied to the present invention.

Furthermore, hot-melt ink-jet recording processes in which a melted ink containing a thermoplastic resin is ejected to an intermediate transfer body and the resulting image is transferred onto a recording medium, thermal transfer recording processes in which an ink on a thermosensitive transfer ribbon is transferred onto a recording medium by use of a heating element, and printing processes such as gravure printing, offset printing, screen printing, pad printing and stencil printing may be applied to the present invention as long as the inks are prepared to be thermoplastic with appropriate viscoelasticity.

The particle diameter of the powdery image forming materials may be properly selected depending on application; in particular, the volume average particle size of 3 to 15 μm tends to bring about excellent images with relatively large thickness on recording media, thus leading to appropriate image erasion.

The powdery image forming materials utilized in the present invention may be ones produced by conventional milling processes, or ones produced by chemical processes such as of dispersion polymerization and suspension polymerization that can be well-controlled with respect to particle diameter, particle diameter distribution, shape, etc. compared to the milling processes, or others being appropriate for the present invention.

In the present invention, the image forming materials comprise a thermoplastic resin in order to exhibit appropriate fixing ability and the peeling property as described above. Examples of the thermoplastic resin include polyester resins, polystyrenes, poly-p-chlorostyrene, styrene-p-chlorostyrene copolymers, styrene-propylene copolymers, styrene-vinyltoluene copolymers, styrene-vinylnaphthalene copolymers, styrene-methylacrylate copolymers, styrene-ethylacrylate copolymers, styrene-butylacrylate copolymers, styrene-octylacrylate copolymers, styrene-methylmethacrylate copolymers, styrene-ethylmethacrylate copolymers, styrene-butylmethacrylate copolymers, styrene-alpha-chloromethylmethacrylate copolymers, styrene-acrylonitrile copolymers, styrene-vinylmethylketone copolymers, styrene-butadiene copolymers, styrene-isoprene copolymers, styrene-acrylonitrile-indene copolymers, styrene-maleic acid copolymers, styrene-maleate copolymers, polymethylmethacrylate, polybutylmethacrylate, polyvinyl chloride, polyvinyl acetate, polyethylene, polypropylene, epoxy resins; epoxypolyol resins, polyurethane, polyamide, polyvinylbutyral, polyacrylic acid resins, rosins, modified rosins, terpene resins, aliphatic or cycloaliphatic hydrocarbon resins, aromatic petroleum resins. Among these thermoplastic resins, polyester resins and styrene-acrylic resins are preferable in particular.

The content of these resins is preferably 50 to 99.5% by mass in the image forming materials, particularly preferably 80 to 97% by mass. The glass transition temperature Tg, melting temperature and viscoelasticity of the thermoplastic resin in image forming materials are important in order to exhibit appropriate fixing/erasing properties of image forming materials. The glass transition temperature of 40° C. to 100° C. may make possible to fix and erase the image forming materials at relatively low temperatures and to provide appropriate storage stability; more preferably, the glass transition temperature is 50° C. to 70° C. Preferably, the thermoplastic resin exhibits 10000 dyne/$cm^2$ of storage modulus at frequency 20 Hz and temperature 80° C. or more, more preferably 90° C. to 160° C.

In the process to fix the image forming materials containing the thermoplastic resins, it is preferred that the image forming materials are pressed and fixed onto recording media by use of a fixing member heated at 100° C. or more. The fixing strength of the image forming materials with inventive recording media, which being dependent with linear velocity, heating period and pressure, is typically insufficient when heated by use of a heating member of below 100° C.; preferable heating temperature of the fixing member is 100° C. to 240° C.

The image forming materials may contain a colorant as an optional ingredient. Examples of the colorant include black pigments such as carbon blacks and iron oxide; yellow pigments such as C.I. pigment yellow 12, C.I. pigment yellow 13, C.I. pigment yellow 14, C.I. pigment yellow 15, C.I. pigment yellow 17, C.I. pigment yellow 93, C.I. pigment yellow 94, C.I. pigment yellow 138, C.I. pigment yellow 155, C.I. pigment yellow 156, C.I. pigment yellow 180 and C.I. pigment yellow 185; magenta pigments such as C.I. pigment red 2, C.I. pigment red 3, C.I. pigment red 5, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 166, C.I. pigment red 177, C.I. pigment red 178 and C.I. pigment red 222; cyan pigments such as C.I. pigment blue 15, C.I. pigment blue 15:2, C.I. pigment blue 15:3, C.I. pigment blue 16 and C.I. pigment blue 60. These colorants are preferably incorporated into image forming materials in an amount of 0.5 to 20% by mass, more preferably 1 to 10% by mass.

It is preferred that the inventive image forming material comprises a wax in an amount of 1% by mass or more as a mold-release agent. Examples of the wax include carnauba wax, montan wax, honey wax, paraffin wax, and microcrystalline wax. The inclusion of these waxes in an amount of 1 to 10% by mass into image forming materials may effectively prevent in many cases so-called offset, i.e. deposition of partial image forming materials onto thermal fixing rollers or fixing belts, even without applying silicone oil to the thermal fixing rollers or fixing belts, which leading to simple construction of image forming apparatuses.

The recording media in the present invention are based on cellulose fibers and the additional solid content is no more than the amount able to be added at size pressing; consequently, image forming materials can intertwine with cellulose fibers, the fixing ability emerges due to a mechanical anchor effect in a sufficient level for practical use and thus offsets can be prevented, which may afford a significant advantage that image forming materials are transferred and removed toward peeling members with no use of image removal-promoting liquid.

On the other hand, since the additional solid content is no more than the amount able to be added at size pressing and there remains some irregularity affected by cellulose fibers, it may be difficult to remove sufficiently perfectly the remaining image forming materials by use of peeling members formed merely of thermal resistant plastics such as polyethylene terephthalate, polyethylene naphtylate, polyimide, polysulfone, polyetheretherketone and polyphenylene sulfide; or metals such as stainless steel and nickel.

Accordingly, it is preferred in the image erasing process that the surface layer of peeling members to be contacted with recording media in the thermal transfer contains a thermoplastic resin that exhibits plasticity at the thermal transfer temperature. That is, when the peeling member with such a surface layer and the recording media are contacted and heated, the thermoplastic layer deforms plastically, allowing the contact of the peeling member with low-height images in depressed areas or low-density gray-scale images surrounded by high-height letter images, thereby making possible to remove substantially perfectly the image forming materials on recording media.

However, the use of only the peeling member with such a thermoplastic surface layer may come to insufficient removal of image forming materials in some cases due to its durability in particular. In order to address this problem, it is preferred that two different peeling members are provided and the peeling step is carried out at upper stream as well as lower stream, and the peeling member for the lower stream has the peeling member with such a thermoplastic surface layer.

The image forming apparatus utilized in the inventive method for reusing recording media will be explained with reference to drawings.

Figure 2:
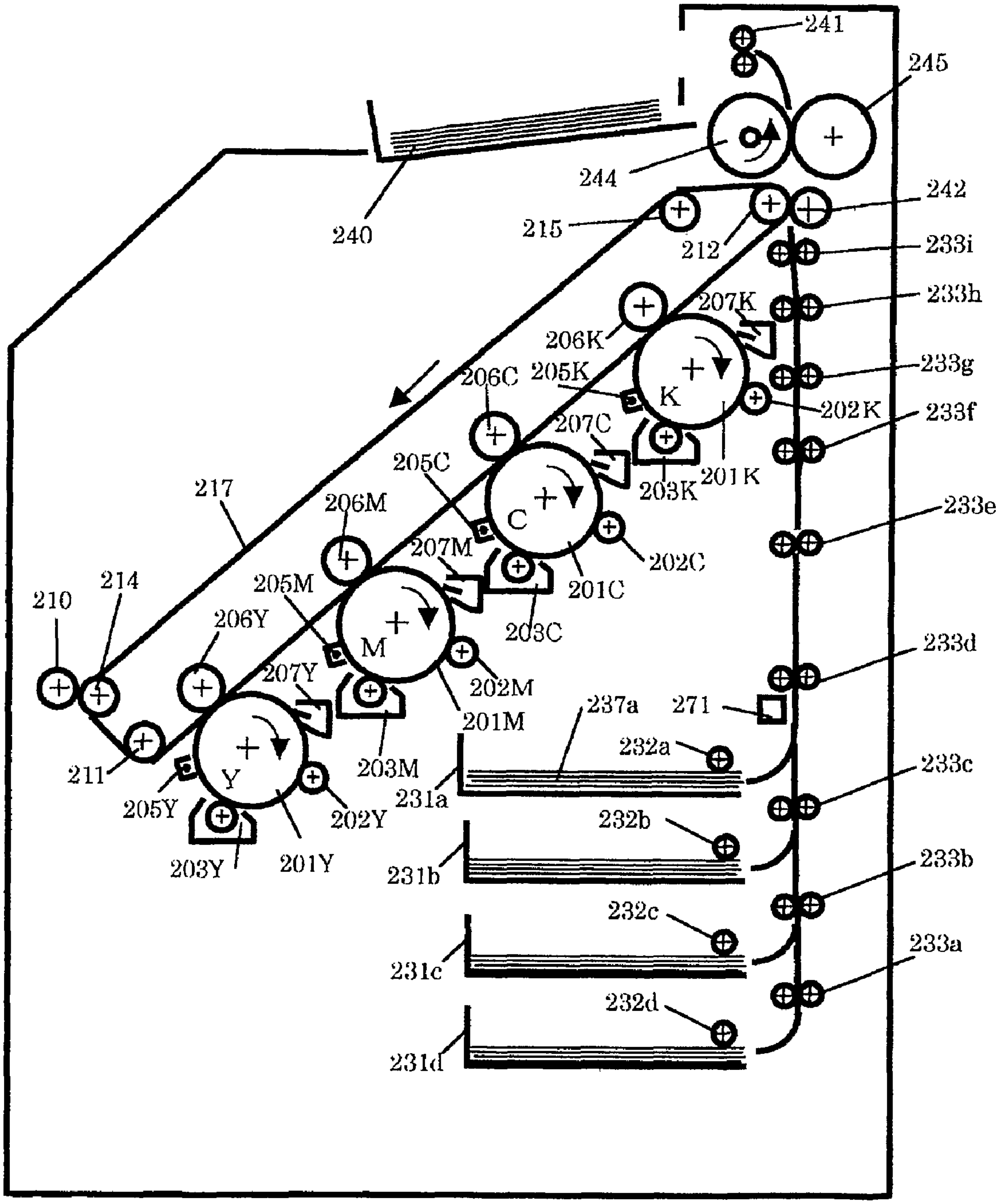
FIG. 2 is a schematic view that shows an exemplary construction of an image forming apparatus for forming images by an electrophotographic process using inventive recording media.

FIG. 2 shows an exemplary construction of an image forming apparatus for forming images by an electrophotographic process.

In the image forming apparatus shown in FIG. 2, yellow (Y), magenta (M), cyan (C) and black (K) images are formed on each photoconductor, the images formed in the different stations are transferred onto an intermediate image-transfer member 217, the transferred images on the intermediate image transfer member 217 is transferred onto a recording medium 237 which is conveyed from a recording medium storage casing 231, and the powdery images formed from image-forming materials are fixed to the recording medium 237 through thermal fixture using an image-fixing roller 244. Such an electrophotographic color-image forming apparatus is conventional and classified into a conventional tandem color electrophotographic apparatus.

The yellow (Y), magenta (M), cyan (C) and black (K) image-forming stations comprise the following conventional components for electrophotographic apparatuses as follows: specifically, the image-forming stations are consisted of for example, photoconductors 201 (201Y, 201M, 201C and 201K), charging means 202 (202Y, 202M, 202C and 202K) for uniformly charging the photoconductors 201, light irradiation means (not shown), developers 203 (203Y, 203M, 203C, 203K), corona wire charges 205 (205Y, 205M, 205C, 205K), means 206 (206Y, 206M, 206C, 206K) for applying an electric field, and cleaning means 207 (207Y, 207M, 207C, 207K).

The image forming apparatus may further comprise any optional components according to necessity in addition to these components. Examples of such additional components are charge-eliminating means, such as an AC charger and light irradiator, for eliminating the charge on the photoconductors 201 after image transfer; and controlling means for detecting the charge voltage applied to the photoconductors 201 in combination with control means for controlling the voltage applied to the chargers 202 so as to keep the surface potentials of the photoconductors 201 at constant level even in varying environmental conditions or in deterioration due to repetitive use. When toner removal from the photoconductors 201 after image transfer is not required, the cleaning means

207 (207Y, 207M, 207C, 207K) can be omitted. Likewise, when there is no need of charging the powdery images formed on the photoconductors 201, the corona wire chargers 205 (205Y, 205M, 205C, 205K) can be omitted.

The intermediate transfer belt 217, which being an endless belt, is arranged to contact rollers 211, 212, 214 and 215 with the inner wall thereof. A tension-mechanism (not shown) applies a suitable tension to the intermediate image-transfer belt 217. The intermediate image-transfer belt 217 has means 210 for eliminating powder deposited on the surface of the belt, such as a brush or roller. The image forming apparatus further comprises charge eliminating means and/or charging means for eliminating or uniforming the charge remained on the intermediate transfer belt after image transfer to the recording medium, depending on requirements.

The recording medium, on which images being finally formed, is housed in recording medium storage casings 231 (231*a*, 231*b*, 231*c*, 231*d*) and is fed to a paper conveying system by action of paper-feed rollers 232 (232*a*, 232*b*, 232*c*, 232*d*) and is conveyed via pairs of paper-feed rollers 233 (233*a*, 233*b*, 233*c*, 233*d*, 233*e*, 233*f*, 233*g*, 233*h*, 233*i*). The powdery image is transferred from the intermediate image-transfer belt 217 to the recording medium by action of means 242 for applying an electric field, such as a voltage applying roller or a corona wire charger.

The image-forming material transferred to the recording medium is fixed thereto by action of image-fixing means typically comprising heating roller or heating belt 244 and pressure roller 245. The recording medium bearing the fixed image is ejected via a pair of output rollers 241 to output tray 240.

The inventive reusable recording media is encased into, for example, paper-feed cassette 231*a* among 231*a* to 231*d*, and non-reusable recording media are encased into the other cassettes 231*b*, 231*c* and 231*d*.

Figure 3:
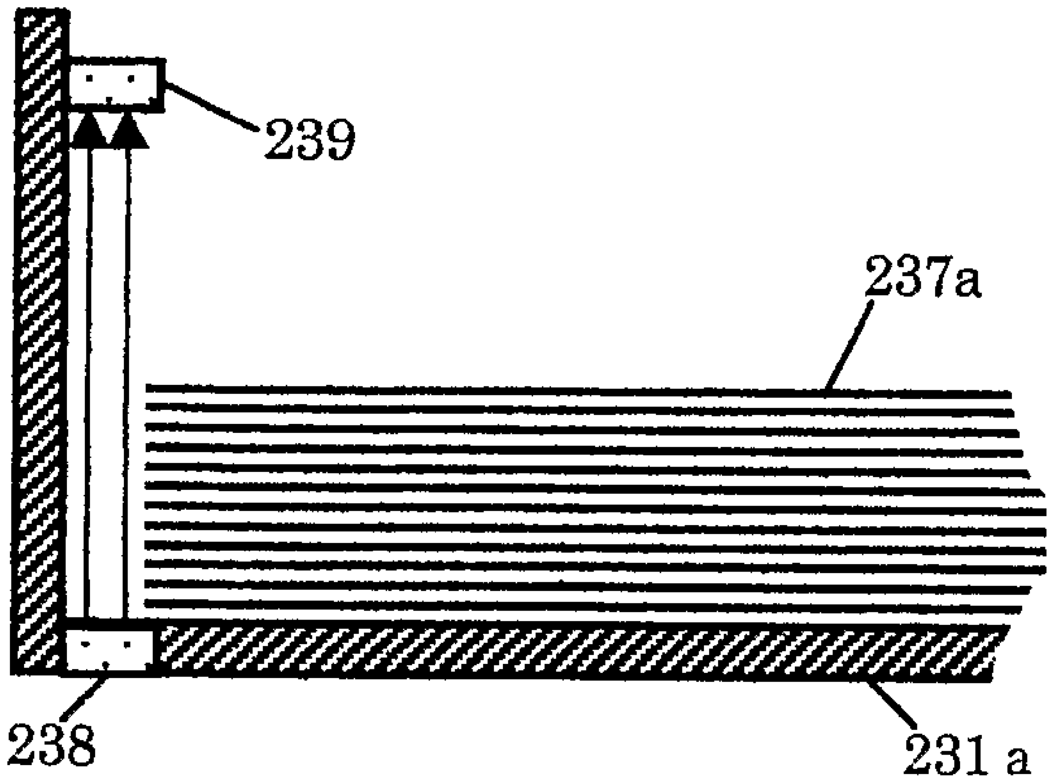
FIG. 3 is a partial enlarged cross-section of a rear edge, viewed in paper-feed direction, of paper-feed cassette shown in FIG. 2.

FIG. 3 is a partial enlarged cross-section of a rear edge, viewed in paper-feed direction, of paper-feed cassette 231*a*. A light-emitting element 238 and a light receiving element 239 are provided at near the rear edge and side edge of the paper-feed cassette 231*a* to detect notches or perforations.

The signal at the light receiving element 239 is delivered to a control unit (not shown) to judge the existence of reusable recording media. Users can select the print mode of a first print mode where reusable recording media being printed or a second print mode where non-reusable recording media being printed.

In the control panel or the user interface, the first image-forming mode may be indicated, for example, as a button or a selection choice marked as "Reuse", "Paper Reuse", "Reuse Mode", "Dedicated Paper", "Reusable Paper", "Resource Saving", "Short-Term Perusal" or "Short-term Use". The second image-forming mode may be indicated, for example, as a button or a selection choice marked as "Image-Fixing Mode", "High Image-Fixing", "Fix Mode", "Plain Paper", "Unused Paper", "Document Storage" or "External Distribution". The selection of the image-forming mode can also be set, for example, so that a higher priority is given to the first image-forming mode, the first image-forming mode is automatically selected unless the user takes an action, and the user takes an action to select the second image-forming mode only in the case where the user wants to form an image according to the second image-forming mode.

An image erasing apparatus, utilized for image erasing in the inventive method for reusing recording media, that comprises a peeling member will be explained in the following.

Specific Example (i)

Figure 4:
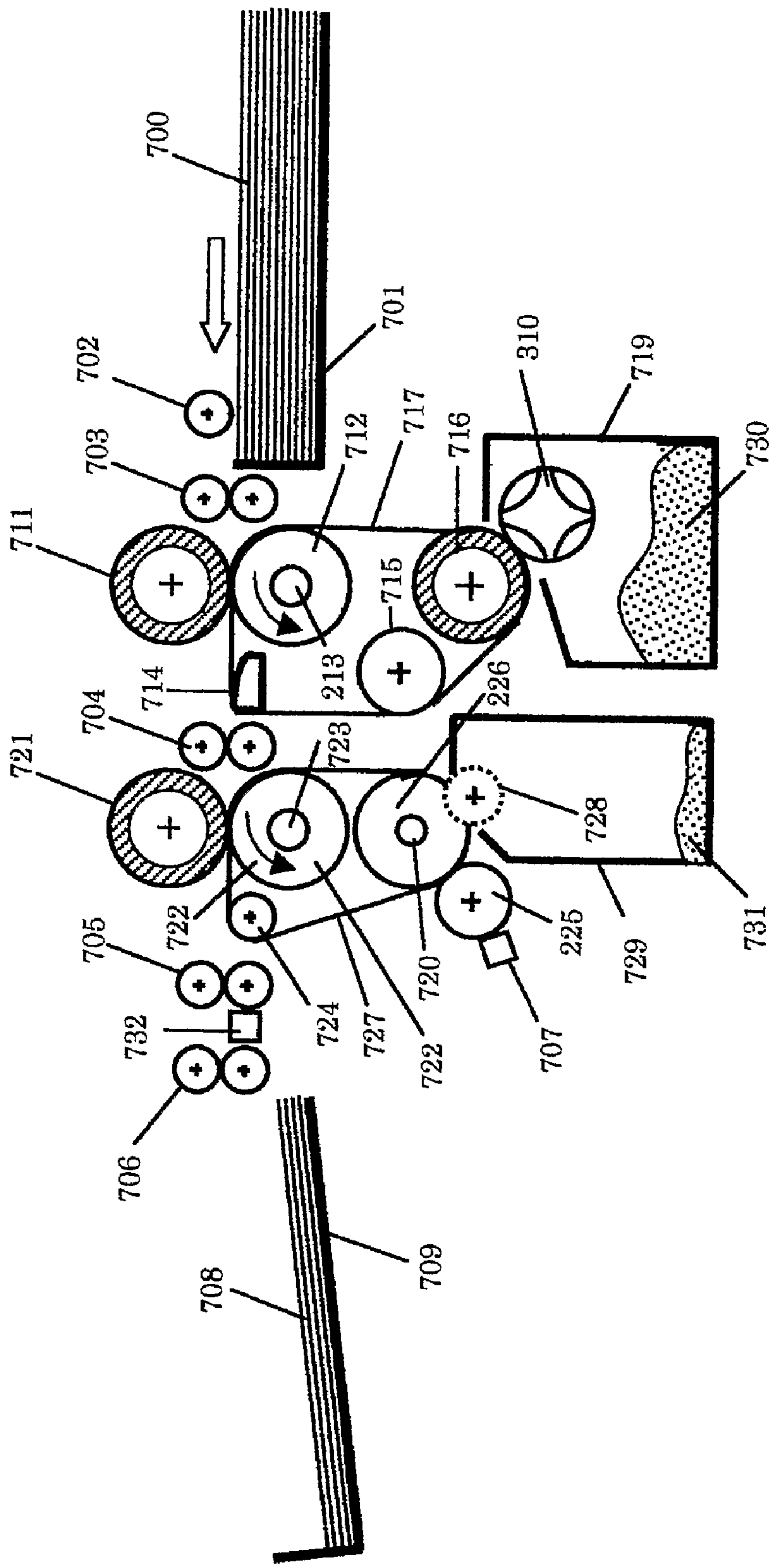
FIG. 4 is a schematic view that shows an exemplary construction of an image erasing apparatus utilized in the inventive method for reusing a recording medium.

FIG. 4 is a schematic view that shows an exemplary construction of an image erasing apparatus utilized in the inventive method for reusing recording media. The apparatus shown in FIG. 4 is constructed such that the removal of image forming materials through thermal transfer is carried out using two different peeling members at upstream and downstream.

In the apparatus shown in FIG. 4, pressure roller 711, heating roller 712, heater 213, peeling member 717, separating block 714, tension roller 715, cleaning backup roller 716, cleaning blade 310 and image forming material-collecting container 719 construct a portion for removing image forming materials that has a peeling member of which the surface layer is non-plasticity at the temperature of the heating and pressing with recording media.

The pressure roller 711 is, for example, an aluminum or stainless roller of 35 mm diameter and 3 mm thick that has an elastic layer of a silicon rubber of 3 mm thick. A pressure unit (not shown) of springs, hydraulic or air pressure is provided between the pressure roller 711 and heating roller 712, thereby recording medium 700 and peeling member are contacted and pressed for removing image forming materials. The heating roller 712 is, for example, an aluminum or stainless roller of 35 mm diameter and 3 mm thick, and the surface is treated with a fluorocarbon resin to avoid the deposition of image forming materials or dusts.

The surface of pressure roller 711 is also treated with a fluorocarbon resin to avoid the deposition of image forming materials or dusts. Heater 213 such as halogen lamps and infrared lamps is disposed inside the heating roller 712. The temperature of the surface of heating roller 712 is detected by a surface thermometer (not shown), the detected temperature is input into a control unit (not shown) to control the electric power into the heater thereby to maintain the surface temperature of the heating roller at a predetermined level.

The peeling member 717, which being an endless belt, is stretched over the heating roller 712, separating block 714, tension roller 715 and cleaning backup roller 716. The tension roller 715 is equipped with an urging member to apply a certain tension to the belt of the peeling member. The adhesive force of the peeling member 717 with the image forming materials is necessary to be higher than the adhesive force of the recording medium with the image forming materials.

The peeling member 717 is a belt of about 75 to 300 μm thick. The material of the peeling member 717 is preferably a film and may be a thermoplastic resin having no plasticity at 60° C. to 150° C. of usual image transfer temperature; examples of the material include polyethylene terephthalate, polyethylene naphtylate, polyimide, polysulfone, polyetheretherketone and polyphenylene sulfide; or metals such as stainless steel and nickel.

The pressure roller 711 is connected to and driven by an electric motor through a gear system (not shown). The peeling member 717 is moved at a linear velocity of 15 to 150 mm/sec, for example.

Figure 5A:
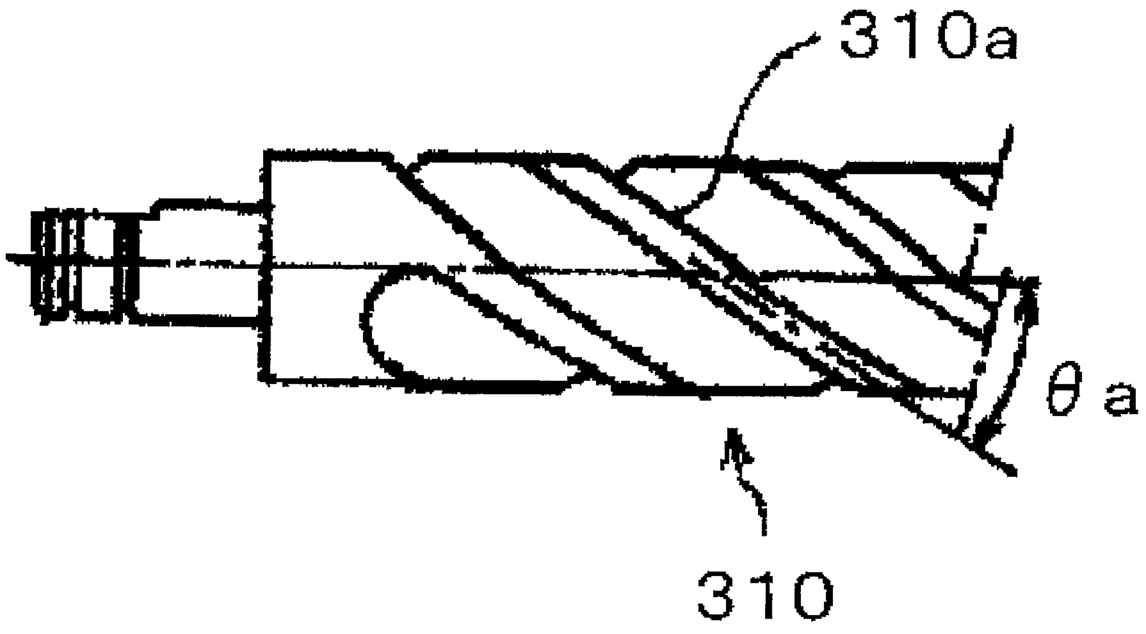
FIG. 5A is a partial enlarged view of a cleaning blade shown in FIG. 4 that comprises a multi-groove spiral edge.
Figure 5B:
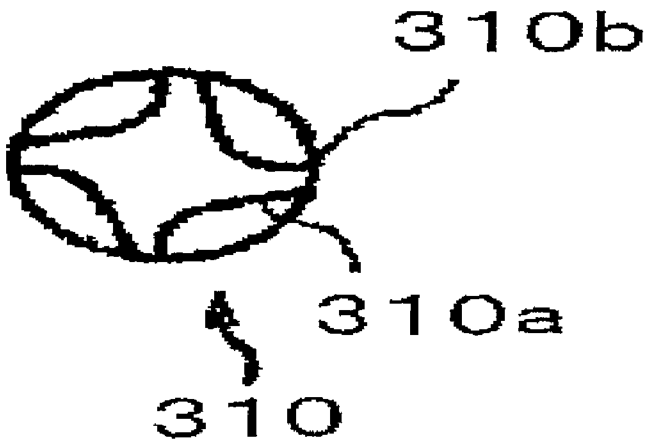
FIG. 5B is a cross sectional view of a cleaning blade shown in FIG. 4 that comprises a multi-groove spiral edge.

The cleaning blade 310 may be, for example, a blade roller with plural-spiral grooves of diameter 25 mm made of a cutting steel, as shown in FIG. 5. Images transferred from recording medium 700 on peeling member 717 may be removed by way of rotating the cleaning blade 310 reversely with the peeling member 717 or rotating the cleaning blade 310 at a different velocity with the peeling member 717. In FIG. 5, 310*a* is an edge of a spiral groove, 310*b* is a spiral groove, and θa is an angle between the center axis of the blade roller and the edge of the spiral groove. The θa is arranged so that image forming materials of on the peeling member 717 can be adequately removed. The cleaning backup roller 716 bears a low-hardness elastomer like a sponge at the surface, and is equipped with a pressure unit (not shown) of springs, hydraulic or air pressure, thereby a pressure is applied with the cleaning blade 310 to form a nip. The image forming materials 730 scraped away by the peeling member 717 are accumulated in a collecting container 719 of image forming materials.

In FIG. 4, pressure roller 721, heating roller 722, heater 723, peeling member 727, separating roller 724, cleaning portion-heating roller 226, heater 720, image forming material-pressure roller 225, cleaning blade 728 and image forming material-collecting container 729 constitute an image forming material-removing/treating portion that has a peeling member of which the surface layer exhibits plasticity at the temperature to contact with the recording media.

The pressure roller 721 has a heat-resistant elastic layer, like of a silicon rubber, similarly with the image forming material-removing/treating portion at upstream side. A pressure unit (not shown) of springs, hydraulic or air pressure is provided between the pressure roller 721 and the heating roller 722, thereby recording medium 700 and peeling member 727 are contacted and pressed for removing image forming materials.

Heater 723 such as halogen lamps and infrared lamps is disposed inside the heating roller 722. The temperature of the surface of heating roller 722 is detected by a surface thermometer (not shown), the detected temperature is input into a control unit (not shown) to control the electric power into the heater thereby to maintain the surface temperature of the heating roller at a predetermined level.

The peeling member 727, which being an endless belt, is stretched over the pressure roller 721, separating roller 724, and cleaning portion-heating roller 226. An urging member (not shown) is equipped with the separating roller 724 to apply a certain tension to the belt of the peeling member. The separating roller is one having a diameter of about 10 mm, of which the curvature making possible to separate the recording media and the peeling member.

Since a greater part of image forming materials on the recording media is removed at upstream side, the adhesive strength between the recording media and the peeling member is relatively small at downstream side compared to at upstream, thus the separating block at the downstream is unnecessary to have a curvature as small as that at upstream.

The peeling member 727 is a belt of about 75 to 300 μm thick, and a thermoplastic resin layer, having plasticity at 60° C. to 160° C. of usual image transfer temperature, is provided on the surface.

The base material of the peeling member 727 is necessary to adhere to the plasticity layer more strongly than between the image forming materials and the recording media; the material may be similar with that of the polymer film of the peeling member 717 at upstream side such as polyethylene terephthalate, polyethylene naphtylate, polyimide, polysulfone, polyetheretherketone and polyphenylene sulfide.

It is also preferred that the base material is improved for the adhesive force with the plasticity layer by way of surface-roughening by sandblast treatment, corona discharge, UV rays irradiation, ion irradiation, electron beam irradiation and oxidation treatment.

The plasticity layer on the base material is preferably of polyvinyl acetate resins, ethylene-vinyl acetate copolymers, styrene-acrylic resins, polyester resins and nylon. Since at least near the surface of the plasticity layer on the base material is intermixed with image forming materials at the transfer step, it is preferred that the material of the plasticity layer is substantially the same with the resin in image forming materials on the recording media or to be used on the recording media. The employment of the same resin with image forming materials may bring about stable image-erasing property under prolonged usage of the image erasing device since the composition of the plasticity layer may be free from significant change thereof.

The image forming material-pressure roller 225 is made of metals such as aluminum and stainless steel having a larger diameter at the roll center compared to at the end face. The surface is treated with compositions with lower surface energy such as fluorocarbon resin in order to inhibit adhesion of image forming materials thereon. A pressure unit (not shown) of springs, hydraulic or air pressure is provided between the image forming material-pressure roller 225 and the cleaning portion-heating roller 226. A pressure is applied between the image forming material-pressure roller 225 and the cleaning portion-heating roller 226 at least when cleaning the peeling member 727, thus the plasticity substance of the plasticity layer on the peeling member 727 migrates to the smaller-diameter end faces of the image forming material-pressure roller 225.

An elastomer layer such as of silicone rubber and sponge is disposed around the surface of the cleaning portion-heating roller 226, and a nip is formed between the pressure unit described above and the image forming material-pressure roller 225. Heater 720 such as halogen lamps and infrared lamps is disposed inside the cleaning portion-heating roller 226. The surface temperature of the cleaning portion-heating roller 226 is detected by a surface thermometer (not shown), the detected temperature is input into a control unit (not shown) to control the electric power into the heater 720 thereby to maintain the surface temperature of the cleaning portion-heating roller 226 at a predetermined level.

The heater 720 performs to heat the plasticity layer on the peeling member thereby to enhance the flowability of the plasticity layer at cleaning the peeling member 727. The heating temperature of the plasticity layer at cleaning, being higher than at removing the image forming materials, may make easy to remove the image forming materials from peeling member 727 due to higher flowability of the plasticity layer. That is, in order to transfer the image forming materials properly into the peeling member at removing the image forming materials, it is necessary that the image forming materials have a degree of elasticity and the plasticity layer exhibits a higher cohesive strength. Separation between recording media and image forming materials with lower cohesive strength may remain the residual image forming materials on the recording media since the image forming materials are separated into the peeling member and the recording medium.

On the contrary, the higher flowability of image forming materials may bring about effective removal of image forming materials on the peeling member, in the removing of image forming materials at downstream side. Accordingly, it is preferred that the temperature at the cleaning portion is about 20° C. to 90° C. higher than that at the peeling member of the image forming material removing portion.

Figure 6:
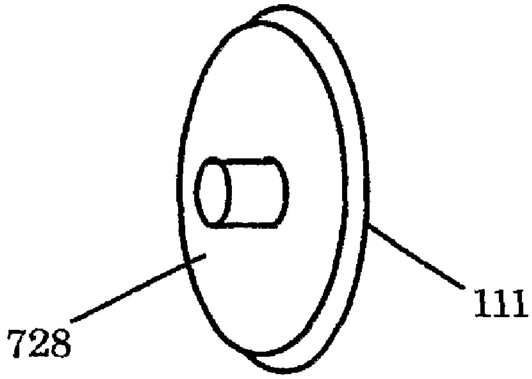
FIG. 6 is an enlarged view of a disc cleaning blade that contacts with a side face edge of a peeling member.

The cleaning blade 728 acts as a cutting blade with a thinner thickness, which having a blade 111 on one side of peeling member as shown in FIG. 6, in order to remove image forming materials protruded from the peeling member rather than scrubbing those on the peeling portion.

The recording media 700, on which images being formed, are set into a paper-feeding cassette 701 with the side to be erased facing downward. The recording media 700 are picked up one by one using a pickup roller 702 and conveyed to image forming material-removing portion at upstream using a pair of paper-feeding rollers 703. The image forming materials on the recording media are heated and pressed by the nip between the pressure roller 711 and the heating roller 712, and the image forming materials made into plasticity adhere to the surface of the peeling member 717.

The recording medium and the peeling member are separated by a separating block 714 having an edge of curvature radium of about 2 mm. At this stage, high-density gray-scale images are transferred to the peeling member among the solid images and letter images. Then the recording medium is conveyed to image forming material-removing portion of downstream site by a pair of paper-feeding rollers 704.

In the image forming material-removing portion at upstream, every time of erasing of the image forming materials leads to removal of image forming materials on the peeling member by use of the cleaning blade 310. It is preferred that the temperature of the image forming materials is higher at the upstream than at downstream.

Higher temperature when pressing at the upstream may enhance the flowability of image forming materials and collapse images with higher height, thus the adhesiveness of gray-scale images or lower images adjacent to higher images may be enhanced. Therefore, the amount of image forming materials to be removed at the upstream may be increased by raising the temperature.

On the other hand, when image forming materials remain on the peeling member with different heights and also the transfer temperature is higher, the image forming materials tend to transfer reversibly to background etc. of recording media. In addition, lower planarity of the peeling member tends to decrease the removable images due to scarce contact of lower images with the peeling member. Therefore, it is preferred that the image forming materials on the peeling member at upstream are removed at every time of erasing of the image forming materials; and that at least the image forming materials transferred on the peeling member are made flat in order to prevent reverse transfer or reduction of life time.

The recording media, a great part of image forming materials having been removed at upstream, are treated similarly at the image forming material-removing portion at downstream. At this down stream, the surface of the peeling member exhibits its plasticity when the recording media and the peeling member are contacted, heated and pressed. The plasticity of the peeling member may make possible to contact the peeling member with image forming materials of various conditions and the image forming materials may be removed efficiently. The temperature of the peeling member at downstream is controlled lower than that of the upstream.

When the temperature at downstream is higher than that at upstream, the plasticity layer of the peeling member adheres strongly with the recording media, which making difficult to separate the recording media and the peeling member or promoting the reverse transfer of the plasticity layer of the peeling member onto the recording media. As such, it is preferred that the temperature of the peeling member at the downstream is 5° C. to 30° C. lower than that of peeling member at upstream; specific temperature thereof is preferably 55° C. to 130° C.

The removal or cleaning of image forming materials on the peeling member at downstream is not necessary to be carried out at every time of the removal processing of image forming materials by the peeling member. In the apparatus shown in FIG. 4, the removal or cleaning is controlled intermittently by a control portion (not shown). The amount of image forming materials removed at downstream is relatively small and the gaps between the transferred images are relatively little, therefore, the processing for removing the image forming materials may be carried out properly at not every time of the removal processing of the peeling member. Furthermore, in order to remove a part of the plasticity layer from the peeling member at downstream, the plasticity layer is preferably heated to a temperature higher than that at removal processing of the image forming materials; therefore, frequent heating of the peeling member is inadequate in view of energy saving.

The cleaning of the peeling member at downstream is preferably carried out intermittently, more specifically, at stop period of removal processing of image forming materials rather than in parallel with the removal processing of image forming materials. This is because the plasticity layer is preferably heated to a temperature higher than that at removal processing of the image forming materials, therefore, the higher temperature at the cleaning portion should be dropped on the way to the image forming material-removing portion, which in turn requiring a cooling unit for the peeling member or longer distance of the peeling member.

Specific Example (ii)

Figure 7:
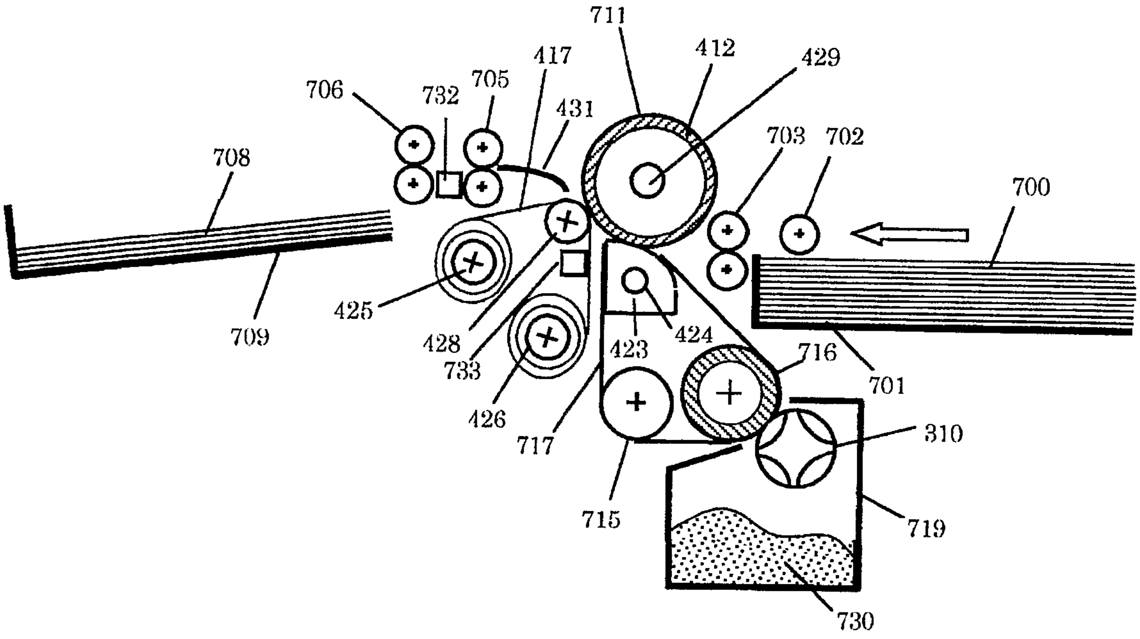
FIG. 7 is a schematic view that shows another exemplary construction of an image erasing apparatus utilized in the inventive method for reusing a recording medium.

FIG. 7 is a schematic view that shows another exemplary construction of an image erasing apparatus utilized in the inventive method for reusing a recording medium. The same reference numbers with FIG. 4 denote common parts. In FIG. 7, heater 424 such as halogen lamps and infrared lamps is disposed inside the heating/separating block 423 made of metals such as aluminum and stainless steel. The temperature of the surface of the heating/separating block 423 is detected by a surface thermometer (not shown), the detected temperature is input into a control unit (not shown) to control the electric power into the heater 720 thereby to maintain the surface temperature of the heating/separating block 423 at a predetermined level.

The pressure roller 711 is, for example, one made of aluminum or stainless steel with 50 mm diameter and 3 mm thick and has a heat-resistant elastic layer like a silicon rubber of 3 mm thick at the surface. A pressure unit (not shown) of springs, hydraulic or air pressure is provided between the heating/separating block, thereby recording medium 700 and peeling member 717 are contacted and pressed for removing image forming materials.

In the apparatus shown in FIG. 7, pressure roller 711, heating/separating block 423, heater 424, peeling member 717, tension roller 715, cleaning backup roller 716, cleaning blade 310 and image forming material-collecting container 719 construct a portion for removing image forming materials, as the upstream portion of FIG. 4, that has a peeling member of which the surface layer is non-plasticity at the temperature of the heating and pressing with recording media.

The peeling member 717, which being an endless belt, is stretched over the heating/separating block 423, tension roller 715 and cleaning backup roller 716. The tension roller 715 is equipped with an urging member to apply a certain tension to the belt of the peeling member.

The heating/separating block 423 is one that has an edge portion of 3 mm curvature radius. The recording medium 700 with images to be removed and peeling member 717 are heated and pressed at the nip between the heating/separating block 423 and pressure roller 711 and then separated at the edge portion of heating/separating block 423. The upper surface of the heating/separating block 423, with which the peeling member slides, is treated with a fluorocarbon resin in order to reduce the friction coefficient and to avoid the deposition of image forming materials or dusts.

The peeling member 717, cleaning backup roller 716, cleaning blade 310 and collection container 719 of image forming materials 719 are constructed and images are erased similarly with those of FIG. 4, and the cleaning operation is controlled to conduct at every removal of image forming materials.

In the exemplary apparatus for removing image forming materials shown in FIG. 7, the peeling member 417 at downstream is formed into a web and wound onto cores 425, 426 so as to treat numerous sheets of recording media. Separating/pressing roller 428 is one with about 30 mm diameter and forms a nip with pressure roller 711 by action of a pressure unit (not shown) such as springs, hydraulic or air pressure. Heater 429 such as halogen lamps and infrared lamps is disposed inside the pressure roller 711, the surface temperature of the pressure roller is detected by a surface thermometer (not shown), and the detected temperature is input into a control unit (not shown) to control the electric power into the heater 429 thereby to maintain the surface temperature of the pressure roller at a predetermined level. The peeling member 417 at downstream and the recording medium, having been removed the image forming materials at upstream and separated from the peeling member, are contacted and pressed between the separating/pressure roller 428 and pressure roller 711. The recording medium, having been substantially completely removed the image forming materials through transferring onto the peeling member with a plasticity layer, is directed by action of guide plate 431 and stored into paper-discharge tray 709 by action of a pair of conveying rollers 705, 706.

In the exemplary apparatus for removing image forming materials shown in FIG. 7, the cleaning by the peeling member at downstream is not conducted within the apparatus. A thermoplastic resin is disposed at the surface of the peeling member at downstream, similarly with FIG. 4, the base material of the peeling member may be preferably polymer compounds far from plasticity at the heating and pressing conditions; preferable examples thereof include polyethylene terephthalate, polyethylene naphtylate, polyimide, polysulfone, polyetheretherketone and polyphenylene sulfide.

In addition to the base materials described above, paper formed essentially of cellulose fibers is appropriately utilized in apparatuses as shown in FIG. 7. That is, conventional kinds of paper are porous and exhibit proper adhesive property, even without surface treatment, with plasticity layers such as polyvinyl acetate resins, ethylene vinylacetate copolymers, styrene-acrylic resins, polyester resins and nylon, therefore, the recording media and the peeling member can be separated with substantially no occurrence of interfacial separation between the base material and the plasticity layer. Furthermore, the paper is inexpensive, and easily turned into fuels or recycle paper.

The web-like peeling member 417 at downstream shown in FIG. 7, wound on core 426, is taken up on core 425 in the process for removing image forming materials. An end mark is put in near the web end. When end mark-detecting unit 733 detects an end mark, a pressure-releasing unit (not shown) releases the pressure between the separating/pressure roller 428 and pressure roller 711, the peeling member at downstream is taken up to core 426, and the peeling member 417 at downstream is used multiple times for removing image forming materials. The peeling member 417 at downstream may be typically used for 100 to 1000 sheets of recording media per one peeling member, provided that the area of the peeling member is the same as that of one sheet of the recording medium.

EXAMPLES

The present invention will be explained more specifically with reference to Examples and Comparative Examples, but these are to be construed as non-limiting the present invention.

Initially, treatment liquids that contain polymers for an image-repellent substance were prepared in the Synthesis Examples (1) to (6) and Comparative Synthesis Example (1) in order to produce recording media for Examples and Comparative Examples, in which the polymers were each a saponified polymer of an olefin having an alkyl group at its side chain and maleic anhydride.

In the descriptions below, all percentages and parts are by weight unless indicated otherwise.

Synthesis Example 1

A linear alpha-olefin mixture (C12 olefin/C13 olefin/C14 olefin =4/3/3 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Treatment Liquid 1).

Synthesis Example 2

A linear alpha-olefin mixture (C16 olefin/C17 olefin/C18 olefin=5/3/2 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Treatment Liquid 2).

Synthesis Example 3

A linear alpha-olefin mixture (C14 olefin/C15 olefin/C16 olefin=3/5/2 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Treatment Liquid 3).

Synthesis Example 4

An alpha-olefin mixture having branched alkyl chains (C12 olefin/C 13 olefin/C14 olefin=2/4/4 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Treatment Liquid 4).

Synthesis Example 5

An alpha-olefin mixture having branched alkyl chains (C18 olefin/C19 olefin/C20 olefin=5/3/2 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Treatment Liquid 5).

Synthesis Example 6

An acrylic acid, esterified with a linear alkyl chain having a carbon number of 18 to 20, was polymerized in a nitrogen atmosphere by a conventional method, then the resulting polymer was dried and dissolved into an aqueous ammonium hydroxide solution to prepare an aqueous solution containing an acrylic polymer, having a long chain alkyl group as a side chain, of 20% by mass as solid content (Treatment Liquid 6).

Comparative Synthesis Example 1

An alpha-olefin mixture having branched alkyl chains (C8 olefin/C9 olefin=6/4 in mole ratio) and maleic anhydride were poured into an autoclave in a mole ratio of 1/1 (olefin/maleic anhydride). The autoclave was backfilled with nitrogen gas, and the mixture of these compounds was allowed to react at 200° C. for 5 hours. The resulting reaction product was saponified with an aqueous ammonium hydroxide solution to prepare an aqueous solution containing a polymer of 20% by mass as solid content (Comparative Treatment Liquid 1).

Recording media were produced using Treatment Liquids 1 to 6 and Comparative Treatment Liquid 1.

Example 1

A neutral rosin sizing agent of an internal sizing agent, aluminum sulfate and clay were added 0.11 part, 0.6 part and 5 parts respectively to Kraft pulp, which having been refined to 400 ml freeness. The mixture was stirred and dispersed to prepare a pulp dispersion, from which paper was made using a fourdrinier, followed by applying and drying the Size Press-Treatment Liquid 1 shown below on the paper in a total dried amount of 5.6 g/m$^2$ at both sides, thereby to prepare a recording medium of 72 g/m$^2$. The amounts of ingredients in the Treatment Liquid 1 are expressed as solid contents.

| Size Press-Treatment Liquid 1 | |
|---|---|
| Starch oxide | 9% |
| Polyvinyl alcohol (saponified degree: 98%) | 1% |
| Saponified product of olefin-maleic anhydride polymer*1) | 2% |
| Water | balance (88%) |

*1)Synthetic Example 2

The resulting recording medium was surface-treated to a smoothness of about 250 seconds at both sides using a calendar. The resulting rolled recording medium was cut into A4 size, then a notch as shown in FIG. 1*a* was marked to inform to be a reusable recording medium by use of a guillotine cutter to prepare a reusable recording medium.

Example 2

A recording medium was prepared in the same manner as Example 1, following the paper making by use of the fourdrinier, except that the Size Press-Treatment Liquid 2 shown below as solid content was applied and dried on the resulting paper in a total dried amount of 4.5 g/m$^2$ at both sides, thereby to prepare a recording medium of 71 g/m$^2$.

| Size Press-Treatment Liquid 2 | |
|---|---|
| Starch oxide | 6% |
| Saponified product of olefin-maleic anhydride polymer*1) | 5% |
| Water | balance (89%) |

*1)Synthetic Example 1

The resulting recording medium was surface-treated to a smoothness of about 200 seconds at both sides using a calendar, then cut into A4 size and a notch was marked in the same manner as Example 1 to prepare a reusable recording medium.

Example 3

A recording medium was prepared in the same manner as Example 1, following the paper making by use of the fourdrinier, except that the Size Press-Treatment Liquid 3 shown below as solid content was applied and dried on the resulting paper in a total dried amount of 3.2 g/m$^2$ at both sides, thereby to prepare a recording medium of 70 g/m$^2$.

| Size Press-Treatment Liquid 3 | |
|---|---|
| Starch oxide | 6% |
| Polyvinyl alcohol (saponified degree: 98%) | 1% |
| Carboxymethyl cellulose | 0.5% |
| Saponified product of olefin-maleic anhydride polymer*1) | 2% |
| Water | balance (90.5%) |

*1)Synthetic Example 2

The resulting recording medium was surface-treated to a smoothness of about 300 seconds at both sides using a calendar, then cut into A4 size and a notch was marked in the same manner as Example 1 to prepare a reusable recording medium.

Example 4

An alkylketene dimer sizing agent of an internal sizing agent and clay were added 0.2 part and 3 parts respectively to Kraft pulp, which having been refined to 400 ml freeness. The mixture was stirred and dispersed to prepare a pulp dispersion, from which paper was made using a fourdrinier, followed by applying and drying the Size Press-Treatment Liquid 4 shown below on the paper in a total dried amount of 3.8 g/m$^2$ at both sides, thereby to prepare a recording medium of 70 g/m$^2$.

| Size Press-Treatment Liquid 4 | |
|---|---|
| Starch oxide | 4% |
| Styrene-butadiene copolymer emulsion | 2% |

-continued

| Size Press-Treatment Liquid 4 | |
|---|---|
| Saponified product of olefin-maleic anhydride polymer*1) | 4% |
| Water | balance (90%) |

*1)Synthetic Example 4

The resulting recording medium was surface-treated to a smoothness of about 600 seconds at both sides using a calendar, then cut into A4 size and a notch was marked in the same manner as Example 1 to prepare a reusable recording medium.

Example 5

A recording medium was prepared in the same manner as Example 4, following the paper making by use of the fourdrinier, except that the Size Press-Treatment Liquid 5 shown below as solid content was applied and dried on the resulting paper in a total dried amount of 6.4 g/$m^2$ at both sides, thereby to prepare a recording medium of 73 g/$m^2$.

| Size Press-Treatment Liquid 5 | |
|---|---|
| Starch oxide | 5% |
| Styrene-butadiene copolymer emulsion | 3% |
| Saponified product of olefin-maleic anhydride polymer*1) | 5% |
| Water | balance (87%) |

*1)Synthetic Example 5

The resulting recording medium was cut into A4 size without the surface treatment using the calendar (smoothness: about 35 seconds), then a notch was marked in the same manner as Example 1 to prepare a reusable recording medium.

Example 6

A recording medium was prepared in the same manner as Example 2, following the paper making by use of the fourdrinier, except that the Size Press-Treatment Liquid 6 shown below as solid content was applied and dried on the resulting paper in a total dried amount of 6.2 g/$m^2$ at both sides, thereby to prepare a recording medium of 73 g/$m^2$.

| Size Press-Treatment Liquid 6 | |
|---|---|
| Starch oxide | 3% |
| Acrylic polymer of Synthetic Example 6 | 7% |
| Water | balance (90%) |

The resulting recording medium was surface-treated to a smoothness of about 350 seconds at both sides using a calendar, then cut into A4 size and a notch was marked in the same manner as Example 1 to prepare a reusable recording medium.

Example 7

A recording medium was prepared in the same manner as Example 4, following the paper making by use of the fourdrinier, except that the Size Press-Treatment Liquid 7 shown below as solid content was applied and dried on the resulting paper in a total dried amount of 1.0 g/$m^2$ at both sides, thereby to prepare a recording medium of 69 g/$m^2$.

| Size Press-Treatment Liquid 7 | |
|---|---|
| Starch oxide | 2% |
| Styrene-butadiene copolymer emulsion | 1% |
| Saponified product of olefin-maleic anhydride polymer*1) | 4% |
| Water | balance (93%) |

*1)Synthetic Example 2

The resulting recording medium was surface-treated to a smoothness of about 600 seconds at both sides using a calendar, then cut into A4 size and a notch was marked in the same manner as Example 1 to prepare a reusable recording medium.

Example 8

A recording medium was prepared in the same manner as Example 4, following the paper making by use of the fourdrinier, except that the Size Press-Treatment Liquid 8 shown below as solid content was applied and dried on the resulting paper in a total dried amount of 8.0 g/$m^2$ at both sides, thereby to prepare a recording medium of 69 g/$m^2$.

| Size Press-Treatment Liquid 8 | |
|---|---|
| Starch oxide | 8% |
| Styrene-butadiene copolymer emulsion | 2% |
| Saponified product of olefin-maleic anhydride polymer*1) | 3% |
| Water | balance (87%) |

*1)Synthetic Example 2

The resulting recording medium was cut into A4 size and a notch was marked in the same manner as Example 1 to prepare a reusable recording medium having a smoothness of 42 seconds.

Comparative Example 1

A recording medium was prepared in the same manner as Example 2, following the paper making by use of the fourdrinier, except that the Size Press-Treatment Liquid 9 shown below as solid content was applied and dried on the resulting paper in a total dried amount of 4.5 g/$m^2$ at both sides.

| Size Press-Treatment Liquid 9 | |
|---|---|
| Starch oxide | 6% |
| Saponified product of olefin-maleic anhydride polymer*1) | 5% |
| Water | balance (89%) |

*1)Comparative Synthetic Example 1

The resulting recording medium was surface-treated to a smoothness of about 200 seconds at both sides using a calendar, then cut into A4 size and a notch was marked in the same manner as Example 1 to prepare a reusable recording medium.

Comparative Example 2

A recording medium was prepared in the same manner as Example 1, following the paper making by use of the fourdrinier, except that the Size Press-Treatment Liquid 10 shown below as solid content was applied and dried on the resulting paper in a total dried amount of 3.2 g/$m^2$ at both sides.

| Size Press-Treatment Liquid 10 | |
|---|---|
| Starch oxide | 6% |
| Polyvinyl alcohol (saponified degree: 98%) | 1% |
| Carboxymethyl cellulose | 0.5% |
| Saponified product of olefin-maleic anhydride polymer*[1)] | 2% |
| Water | balance (90.5%) |

*[1)]Comparative Synthetic Example 1

The resulting recording medium was surface-treated to a smoothness of about 300 seconds at both sides using a calendar, then cut into A4 size and a notch was marked in the same manner as Example 1 to prepare a reusable recording medium.

Comparative Example 3

Commercially available PPC paper (by Ricoh Co., Type 6200, weight: about 70 g/m$^2$) of A4 size was made a notch in the same manner as Example 1 to prepare a comparative recording medium.

Comparative Example 4

Commercially available PPC paper (by Ricoh Co., Type 6200, weight: about 70 g/m$^2$) of A4 size was surface-treated to a smoothness of about 800 seconds at both sides using a calendar to prepare a comparative recording medium.

Comparative Example 5

The Size Press-Treatment Liquid 5, of the same composition with that of Example 5, was applied and dried onto both sides of commercially available PPC paper (by Ricoh Co., Type 6200, weight: about 70 g/m$^2$) by use of a wire bar in a dried amount of 4.1 g/m$^2$ per one side to prepare a recording medium. The resulting recording medium was cut into A4 size and a notch was marked in the same manner as Example 5 to prepare a comparative recording medium 5. That is, the Size Press-Treatment Liquid 5 was applied at other than size pressing after paper making in this Comparative Example 5.

Comparative Example 6

Five percent aqueous solution of perfluoroalkyl carboxylate (monomer surfactant) was filled into a developer-supply device of a diazo copier, and applied and dried on both sides of commercially available PPC paper (by Ricoh Co., Type 6200, weight: about 70 g/m$^2$) in a dry amount of 0.15 g/m$^2$ per one side. Then the resulting paper was cut into A4 size and a notch was marked in the same manner as Example 1 to prepare a comparative recording medium.

Comparative Example 7

Fifteen percent aqueous solution of dioctyl sulfosuccinate (monomer surfactant) was filled into a developer-supply device of a diazo copier, and applied and dried on both sides of commercially available PPC paper (by Ricoh Co., Type 6200, weight: about 70 g/m$^2$) in a dry amount of 0.3 g/m$^2$ per one side. Then the resulting paper was cut into A4 size and a notch was marked in the same manner as Example 1 to prepare a comparative recording medium.

Comparative Example 8

A recording medium was prepared in the same manner as Example 2, following the paper making by use of the fourdrinier, except that the Size Press-Treatment Liquid 11 shown below as solid content was applied and dried on the resulting paper in a total dried amount of 4.3 g/m$^2$ at both sides.

| Size Press-Treatment Liquid 11 | |
|---|---|
| Starch oxide | 7% |
| Polyvinyl alcohol (saponified degree: 98%) | 3% |
| Alkylketene dimer (emulsion) | 4% |
| Water | balance (86%) |

The resulting recording medium was surface-treated to a smoothness of about 350 seconds at both sides using a calendar, then cut into A4 size and a notch was marked in the same manner as Example 2 to prepare a reusable recording medium.

Comparative Example 9

A non-solvent silicone resin prepolymer was applied onto both sides of commercially available PPC paper (by Ricoh Co., Type 6200, weight: about 70 g/m$^2$) by use of a wire bar in an amount of 2.5 g/m$^2$, then the resin prepolymer was cured by irradiating UV rays, and the resulting recording medium was cut into A4 size and a notch was marked in the same manner as Example 1 to prepare a comparative recording medium.

Color image formation and removal of the image forming materials were repeated using the recording media of Examples 1 to 8 and Comparative Examples 1 to 9, then image properties for clearness, offset and fixing ability as well as image erasing property were evaluated.

Evaluation Conditions

Image Formation

Color images were formed using the image forming apparatus, of the construction being shown in FIG. 2 as described above, equipped with a unit to detect notches. No silicone oil was applied to the thermal fixing roller unless described definitely. The recording media, each having a notch, of Examples 1 to 8 and Comparative Examples 1 to 9 were encased into the paper feed cassette of the image forming apparatus, a toner containing a principal component of a polyester and a wax of 1% mass or more (by Ricoh Co, Imagio Neo C285 colorant) was filled into the developing unit, and color images were formed under the following conditions. The results are shown in Table 1. The condition where wax being contained in the colorant (Imagio Neo C285) is expressed as "wax" and the condition where no wax being contained in the colorant (Imagio Neo C385) is expressed as "non-wax". In a condition of "non-wax", the condition where silicone oil being fed to the fixing roller was also carried out.

Conditions:

Process linear speed: 130 mm/sec

Fixing roller temperature: 170° C.

Fixing roller pressure: 15 N/cm$^2$

The resulting images were evaluated in accordance with the following methods.

(a) Image Clearness (Density)

The image density of solid images was measured by a reflective densitometer (by Gretag MacBeth Co.) and evaluated under the following criterion.

Criterion of Image Density

A: >1.6

B: 1.0 to 1.6

C: <1.0

(b) Existence of Offset

Secondary color solid images of red, blue and green and low density gray-scale images were visually observed and image defect was inspected, then the offset was evaluated in terms of image dropout.

Criterion of Offset

A: no dropout

B: some dropout

C: significant dropout (c) Image-Fixing Ability I (Smear Process)

A gray-scale image (area rate: 30%) was rubbed 10 times by a white cloth attached to a clock meter, and the image density of the cloth was measured by the reflective densitometer (by Gretag MacBeth Co.), while subtracting the density of the cloth itself.

Criterion of Density

A: ≦0.20

B: 0.20 to 0.39

C: ≧0.40

(d) Image-Fixing Ability II (Drawing Process)

A 300 g load was put on a needle having a ruby tip and moved circularly on a green solid image, then the existence of image peeling was visually evaluated.

Criterion of Peeling

A: narrow and slight peeling, or no peeling

B: narrow peeling at about 20% of needle traces

C: peeling at more than 20% of needle traces

Peeling member: polyimide film of 100 μm thick

Cleaning Blade: four-groove spiral cleaning blade, cutting steel, diameter 25 mm Surface of cleaning backup roller: urethane sponge Rotating direction of blade: reverse to that of peeling member Heating roller: 135° C.

Image Removing Portion at Downstream

Peeling member: polyimide film of 100 μm thick on which black toner (by Ricoh Co, Imagio Neo C385 colorant) being thermally fixed to 25 μm thick Pressing roller for image forming materials: central diameter 30 mm, which being larger by 0.5 mm than edge face Heating roller: 110° C.

The image erasing property was evaluated in a way that solid images of yellow, magenta, cyan and black were erased, and the remaining image densities were measured by the reflective densitometer (by Gretag MacBeth Co.). The evaluation was carried out for the highest remaining density, while subtracting the density of unused recording media themselves.

Criterion of Image Erasing Property (Remaining Image Density)

A: ≦0.02

B: 0.03 to 0.09

C: 0.10 to 0.29

D: ≧0.30

TABLE 1

| Recording Medium | Image Forming Material | Silicone Oil on Roller | Image Properties: Clarity (density) 1st | 10th | 20th | Offset 1st | 10th | 20th | Fixing (smear) 1st | 10th | 20th | Fixing (drawing) 1st | 10th | 20th | Image Erasing Property 1st | 10th | 20th |
|---|---|---|---|---|---|---|---|---|---|---|---|---|---|---|---|---|---|
| Ex. 1 | wax | non | A | A | A | A | A | A | A | A | A | A | A | A | A | A | A |
| Ex. 2 | wax | non | A | A | A | A | A | A | A | A | A | A | A | A | A | A | A |
| Ex. 3 | wax | non | A | A | A | A | A | A | A | A | A | A | A | A | A | A | A |
| Ex. 4 | wax | non | A | A | A | A | A | A | A | A | A | A | A | A | A | A | A |
| Ex. 5 | wax | non | A | A | A | A | A | A | A | A | A | A | A | A | A | A | A |
| Ex. 6 | non-wax | non | A | A | A | B | B | B | A | A | A | B | B | B | B | B | C |
| Ex. 6 | non-wax | exist | A | A | A | A | A | A | A | A | A | B | B | B | B | B | C |
| Ex. 6 | wax | non | A | C | — | B | C | — | A | A | — | B | — | — | B | B | — |
| Ex. 7 | wax | non | A | A | A | A | A | A | A | A | A | A | A | A | B | B | B |
| Ex. 8 | wax | non | A | A | A | B | B | B | A | A | A | B | B | B | A | A | A |
| Co. Ex. 1 | wax | non | A | — | — | A | — | — | A | — | — | A | — | — | C | — | — |
| Co. Ex. 2 | wax | non | A | — | — | A | — | — | A | — | — | A | — | — | C | — | — |
| Co. Ex. 3 | wax | non | A | — | — | A | — | — | A | — | — | A | — | — | D | — | — |
| Co. Ex. 4 | wax | non | A | — | — | A | — | — | A | — | — | A | A | A | D | — | — |
| Co. Ex. 5 | wax | non | A | A | A | B | B | C | A | A | B | B | B | B | A | A | A |
| Co. Ex. 5 | non-wax | exist | A | A | A | A | A | A | A | A | B | B | B | B | A | A | A |
| Co. Ex. 5 | non-wax | non | C | — | — | C | — | — | A | — | — | — | — | — | A | — | — |
| Co. Ex. 6 | wax | non | A | A | — | A | A | — | A | A | — | A | A | — | B | C | — |
| Co. Ex. 7 | wax | non | B | B | — | B | B | — | A | A | — | A | A | — | B | C | — |
| Co. Ex. 8 | wax | non | A | A | — | C | B | — | A | A | — | B | A | — | A | C | — |
| Co. Ex. 9 | wax | non | A | A | A | B | B | B | C | C | C | C | C | C | A | A | A |

Removal of Image Forming Material

The image forming materials formed on recording media were removed with respect to images formed on the recording media of Examples 1 to 8 and Comparative Examples 1 to 9 by use of the image erasing apparatus shown in FIG. 4. The removal of the image forming materials was carried out up to 20 times while forming substantially same images as described above on the same recording media.

The conditions to remove image forming materials are as follows: Conditions:

Process linear speed (velocity of peeling member): 40 mm/sec

Image Removing Portion at Upstream

The results shown in Table 1 demonstrate that the inventive recording media, produced with treatment liquids comprising polymers having an alkyl group with a carbon number of 8 or more, may represent superior fixing ability as well as excellent image erasing property, and be reusable under sequential image forming/erasing processes without impairing their quality. The recording medium of Comparative Example 5, which being produced with the Treatment Liquid 5 usable in the present invention, exhibited relatively superior fixing ability as well as excellent image erasing property in a condition of image forming materials with no wax as well as the image forming apparatus which supplying silicone oil to the fixing device; however, offset occurred even on the virgin recording medium when no silicone oil being supplied.

INDUSTRIAL APPLICABILITY

The inventive method for reusing a recording medium may allow repetitive use of recording media in particular paper on which images are repeatedly formed and erased, therefore, contribute to saving of energy and resource. The image forming process may be electrophotographic processes, toner-jet processes and ion-flow processes provided that the image forming materials comprises a thermoplastic resin, thus the present invention may be widely utilized in the art. The inventive reusable recording media, methods for producing the reusable recording media and image forming apparatuses may contribute to saving of energy and resource in a similar manner under different aspects.

The invention claimed is:

1. A method for reusing a recording medium, comprising:

forming an image on a recording medium by use of an image forming material, and, removing the image forming material from the recording medium through thermal transfer at an upstream side and at a downstream side by use of two different peeling members, wherein the recording medium is paper that is produced through applying a treatment liquid at size pressing after paper making and then drying the treatment liquid, the treatment liquid comprises a water-soluble or water-dispersible polymer having an alkyl group with 8 or more carbon atoms at its side chain as an image-repellent substance, the image forming material comprises a thermoplastic resin, and the adhesive strength between the peeling members and the image forming material is higher than the adhesive strength between the recording medium and the image forming material, wherein the surface layer of the peeling member at the upstream side contacted with the recording medium at the thermal transfer comprises a thermoplastic resin that exhibits substantially no plasticity at the thermal transfer temperature of the image forming material or metals, and the surface layer of the peeling member at the downstream side contacted with the recording medium at the thermal transfer comprises a thermoplastic resin that exhibits plasticity at the thermal transfer temperature of the image forming material.

2. The method for reusing a recording medium according to claim 1, wherein the water-soluble or water-dispersible polymer is produced by saponifying a polymer formed from an olefin having a double bond at alpha-site and 10 or more carbon atoms, and maleic anhydride.

3. The method for reusing a recording medium according to claim 1, wherein the treatment liquid comprises, in addition to the water-soluble or water-dispersible polymer, at least a compound selected from the group consisting of starches, starch derivatives, polyvinyl alcohols, styrene-butadiene copolymer emulsions, vinyl acetate emulsions, and water-soluble or water-dispersible acrylic resins, in an amount that the weight ratio of the polymer to the compound is from 1:50 to 1:1 as solid content.

4. The method for reusing a recording medium according to claim 1, wherein the treatment liquid is applied to one side of the paper in an amount of 0.5 to 4 $g/m^2$ as solid content.

5. The method for reusing a recording medium according to claim 1, wherein an expression is displayed on the recording medium to be reusable through removing the image forming material.

6. The method for reusing a recording medium according to claim 1, wherein the image forming material is removed through thermal transfer by use of the peeling members without applying an image removal-promoting liquid.

7. The method for reusing a recording medium according to claim 1, wherein the image forming material comprises a wax in an amount of 1% by mass or more.

8. The method for reusing a recording medium according to claim 1, wherein the image is formed by use of a powdery image-forming material that contains a thermoplastic resin and a colorant by an electrophotographic process.

9. An image forming apparatus adapted to use a reusable recording medium, the apparatus comprising:

a thermally fixing unit configured to form an image by use of a thermoplastic powdery-image-forming material and to thermally fix the image on the recording medium, wherein the reusable recording medium is produced by a method for producing a reusable medium, the method comprising:

applying a treatment liquid at size pressing after paper making; and drying the treatment liquid, wherein the treatment liquid comprises a water-soluble or water-dispersible polymer having an alkyl group with 8 or more carbon atoms at its side chain as an image-repellent substance, and the reusable recording medium is utilized in a method for reusing a recording medium, the method comprising forming an image on a recording medium by use of an image forming material and removing the image forming material from the recording medium through thermal transfer at an upstream side and at a downstream side by use of two different peeling members, wherein the image forming material comprises a thermoplastic resin, and the adhesive strength between the peeling members and the image forming material is higher than the adhesive strength between the recording medium and the image forming material, wherein the surface layer of the peeling member at the upstream side contacted with the recording medium at the thermal transfer comprises a thermoplastic resin that exhibits substantially no plasticity at the thermal transfer temperature of the image forming material or metals, and the surface layer of the peeling member at the downstream side contacted with the recording medium at the thermal transfer comprises a thermoplastic resin that exhibits plasticity at the thermal transfer temperature of the image forming material.

10. The image forming apparatus according to claim 9, wherein the thermally fixing unit comprises an oil less fixing device with no function to apply a liquid-release agent onto a surface of a fixing member, and the image forming material comprises a wax in an amount of 1% by mass or more.

11. An image forming apparatus adapted to use a reusable recording medium, the apparatus comprising:

plural paper-feed cassettes for storing recording medium, in which at least one of the plural paper-feed cassettes stores the reusable recording medium, and a control unit configured to optionally select the reusable recording medium to be fed from the paper-feed cassettes, wherein the reusable recording medium is produced by a method for producing a reusable recording medium, the method comprising:

applying a treatment liquid at size pressing after paper making; and drying the treatment liquid, wherein the treatment liquid comprises a water-soluble or water-dispersible polymer having an alkyl group with 8 or more carbon atoms at its side chain as an image-repellent substance, and the reusable recording medium is utilized in a method for reusing a recording medium, the method comprising forming an image on a recording medium by use of an image forming material and removing the image forming material from the recording medium through thermal transfer at an upstream side and at a downstream side by use of two different peeling members, wherein the image forming material comprises a thermoplastic resin, and the adhesive strength between the peeling member and the image forming material is higher than the adhesive strength between the recording medium and the image forming material, wherein the surface layer of the peeling member at the upstream side contacted with the recording medium at the thermal transfer comprises a thermoplastic resin that exhibits substantially no plasticity at the thermal transfer temperature of the image forming material or metals, and the surface layer of the peeling member at the downstream side contacted with the recording medium at the thermal transfer comprises a thermoplastic resin that exhibits plasticity at the thermal transfer temperature of the image forming material.

* * * * *